United States Patent
Zohar et al.

(10) Patent No.: US 7,299,334 B2
(45) Date of Patent: Nov. 20, 2007

(54) STORAGE SYSTEM CONFIGURATIONS

(75) Inventors: Ofir Zohar, Alfe-Menashe (IL); Yaron Revah, Tel-Aviv (IL); Haim Helman, Ramat Gan (IL); Dror Cohen, Petach-Tikva (IL); Shemer Schwartz, Herzelia (IL)

(73) Assignee: XIV Ltd., Tel-Aviv (IL)

( * ) Notice: Subject to any disclaimer, the term of this patent is extended or adjusted under 35 U.S.C. 154(b) by 590 days.

(21) Appl. No.: 10/886,372

(22) Filed: Jul. 7, 2004

(65) Prior Publication Data

US 2005/0015544 A1 Jan. 20, 2005

Related U.S. Application Data

(63) Continuation-in-part of application No. 10/620,080, filed on Jul. 15, 2003, and a continuation-in-part of application No. 10/620,249, filed on Jul. 15, 2003.

(51) Int. Cl.
*G06F 12/00* (2006.01)
(52) U.S. Cl. ...................... 711/203; 711/118
(58) Field of Classification Search .......... 711/201, 711/203, 204, 205, 209, 129, 130, 141, 147, 711/221, 154
See application file for complete search history.

(56) References Cited

U.S. PATENT DOCUMENTS

| | | | |
|---|---|---|---|
| 5,694,576 A | 12/1997 | Yamamoto et al. | |
| 6,434,666 B1 | 8/2002 | Takahashi et al. | |
| 6,457,102 B1 | 9/2002 | Lambright et al. | |
| 6,477,618 B2 | 11/2002 | Chilton | |
| 6,490,615 B1 | 12/2002 | Dias et al. | |
| 6,601,137 B1* | 7/2003 | Castro et al. ............... | 711/113 |
| 2001/0020260 A1* | 9/2001 | Kanamaru et al. ............ | 711/4 |
| 2003/0115408 A1* | 6/2003 | Milillo et al. ............... | 711/113 |
| 2005/0015544 A1* | 1/2005 | Zohar et al. ................ | 711/113 |

* cited by examiner

*Primary Examiner*—Brian R. Peugh
(74) *Attorney, Agent, or Firm*—Katten Muchin Rosenman LLP

(57) ABSTRACT

A storage system, including: one or more mass storage devices, coupled to store data at respective first ranges of logical addresses (LAs), and one or more interfaces, which are adapted to receive input/output (IO) requests from host processors directed to specified LAs. The system also includes a plurality of caches coupled to the one or more interfaces so as to receive the IO requests therefrom, each cache being assigned a respective second range of the LAs and being coupled to the one or more mass storage devices, the respective first ranges of which overlap the respective second range, so as to receive data from and provide data to the one or more mass storage devices, and being coupled to accept the IO requests within the respective second range directed thereto.

38 Claims, 13 Drawing Sheets

STORAGE SYSTEM CONFIGURATIONS

RELATED APPLICATIONS

This application is a continuation-in-part of application Ser. No. 10/620,080, titled "Data Allocation in a Distributed Storage System," and of application Ser. No. 10/620,249, titled "Distributed Independent Cache Memory," both filed 15 Jul. 2003, which are incorporated herein by reference.

FIELD OF THE INVENTION

The present invention relates generally to memory access, and specifically to distributed cache design in data storage systems.

BACKGROUND OF THE INVENTION

The slow access time, of the order of 5-10 ms, for an input/output (IO) transaction performed on a disk has led to the need for a caching system between a host generating the IO transaction and the disk. A cache, a fast access time medium, stores a portion of the data contained in the disk. The IO transaction is first routed to the cache, and if the data required by the transaction exists in the cache, it may be used without accessing the disk.

One goal of an efficient caching system is to achieve a high "hit" ratio, where a high proportion of the data requested by IO transactions already exists in the cache, so that access to the disk is minimized. Other desirable properties of an efficient caching system include scalability, the ability to maintain redundant caches and/or disks, and relatively few overhead management transactions.

U.S. Pat. No. 5,694,576 to Yamamoto, et al., whose disclosure is incorporated herein by reference, describes a method for controlling writing from a cache to a disk by adding record identification information to a write request. The added information enables the cache to decide whether data written to the cache should or should not be written to the disk.

U.S. Pat. No. 6,457,102 to Lambright, et al., whose disclosure is incorporated herein by reference, describes a system for storing data in a cache memory that is divided into a number of separate portions. Exclusive access to each of the portions is provided by software or hardware locks. The system may be used for choosing which data is to be erased from the cache in order to make room for new data.

U.S. Pat. No. 6,434,666 to Takahashi, et al., whose disclosure is incorporated herein by reference, describes a caching system having a plurality of cache memories, and a memory control apparatus that selects the cache memory to be used. The memory control apparatus selects the cache so as to equalize use of the cache memories.

U.S. Pat. No. 6,490,615 to Dias, et al., whose disclosure is incorporated herein by reference, describes a scalable cache having caches for storage servers. On receipt of a read request, the caches serve the request or communicate with each other to cooperatively serve the request.

U.S. Pat. No. 6,477,618 to Chilton, whose disclosure is incorporated herein by reference, describes an architecture of a data storage cluster. The cluster includes integrated cached disk arrays which are coupled by a cluster interconnect. A request to one of the arrays is routed, as necessary, to another of the arrays via the cluster interconnect.

SUMMARY OF THE INVENTION

In embodiments of the present invention, a data storage system comprises one or more interfaces which communicate with caches and mass storage devices. The system may be formed in a number of configurations, all of which comprise the mass storage devices storing data at respective first ranges of logical addresses (LAs). In all the configurations each cache is assigned a respective second range of the LAs. The one or more interfaces receive input/output (IO) requests from a host directed to specified LAs and direct all the IO requests to the cache to which the specified LAs are assigned. In some of the configurations one or more communication channels, typically switches, connect elements of the storage system. The communication channels convey IO requests and data between their connected elements.

In a first embodiment, each cache is directly connected to one or more of the mass storage devices, the one or more mass storage devices having LAs within the second range of the cache. A communication channel connects the one or more interfaces and the caches.

In a second embodiment, two or more of the caches are directly connected to one of the mass storage devices, the mass storage device having LAs within the respective second ranges of the two or more caches. A communication channel connects the one or more interfaces and the caches.

In a third embodiment, the caches are connected to each other so that they are able to transfer data and IO requests between themselves. There are an equal number of interfaces and caches, each interface being directly connected to a respective cache. A communication channel connects the caches and the mass storage devices.

In a fourth embodiment, there are an equal number of interfaces, caches and mass storage devices. Each interface connects to a respective cache, which in turn connects to a respective mass storage device. Each mass storage device has LAs within the second range of its connected cache. The caches are connected to each other so that they are able to transfer data and IO requests between themselves.

In a fifth embodiment, there are an equal number of interfaces and caches, each interface being directly connected to a respective cache. The caches are connected to each other so that they are able to transfer data and IO requests between themselves. Two or more of the caches are directly connected to one of the mass storage devices, the mass storage device having LAs within the respective second ranges of the two or more caches.

In a sixth embodiment, there are an equal number of interfaces and caches, each interface being directly connected to a respective cache. The caches are connected to each other so that they are able to transfer data and IO requests between themselves. Each cache is directly connected to one or more of the mass storage devices, the one or more mass storage devices having LAs within the second range of the cache.

In a seventh embodiment, a first communication channel connects the caches and the mass storage devices. A plurality of interfaces are connected to the caches by a second communication channel.

In an eighth embodiment, there are an equal number of caches and mass storage devices. Each cache connects to a respective mass storage device. Each mass storage device has LAs within the second range its connected cache. A plurality of interfaces are connected to the caches by a communication channel.

In a ninth embodiment, the storage system operates as a network attached storage (NAS) system. The mass storage devices store data in a file-based format. The caches receive file-based data from and provide file-based data to the mass storage devices. The one or more interfaces receive file-based IO requests from host processors.

In a tenth embodiment, the storage system operates as a storage area network (SAN) system. The mass storage devices store data in a block-based format. The caches receive block-based data from and provide block-based data to the mass storage devices. The one or more interfaces receive block-based IO requests from host processors.

In some embodiments, a mapping of addresses of the second ranges is stored in the one or more interfaces, for use by the interfaces to direct the IO requests to the appropriate cache. In some of the embodiments, each cache comprises a listing of the second range of the cache, the listing being used by the cache to determine which IO requests are acted on by the cache.

It will be appreciated that aspects of the disclosed embodiments described herein, such as operating as a SAN system and/or as a NAS system, may be combined to create other embodiments. All such embodiments are assumed to be within the scope of the present invention.

In some embodiments, at least some of the interfaces, the caches, and the mass storage devices, are implemented separately, or in combination, from commercially available, off-the-shelf, components. Typically, such commercially available components include, but are not limited to, personal computers.

There is therefore provided, according to an embodiment of the present invention, a storage system, including:

one or more mass storage devices, coupled to store data at respective first ranges of logical addresses (LAs);

one or more interfaces, which are adapted to receive input/output (IO) requests from host processors directed to specified LAs; and a plurality of caches coupled to the one or more interfaces so as to receive the IO requests therefrom, each cache being assigned a respective second range of the LAs and being coupled to the one or more mass storage devices, the respective first ranges of which overlap the respective second range, so as to receive data from and provide data to the one or more mass storage devices, and being coupled to accept the IO requests within the respective second range directed thereto.

Typically, the one or more mass storage devices include a plurality of mass storage devices, and each cache is directly connected to one or more of the plurality of mass storage devices.

In an embodiment, the one or more interfaces are adapted to direct the IO requests to all of the plurality of caches.

The one or more interfaces may include a mapping between the second ranges of each of the caches and the LAs and may be adapted to convert the IO requests to one or more requests and to direct the one or more requests to respective one or more caches in response to the mapping.

In an alternative embodiment each cache includes a listing of LAs corresponding to the second range of the each cache, and the cache is adapted to ignore IO requests directed to LAs not included in the listing.

In an embodiment the plurality of caches includes a first cache and a second cache, and the first cache is coupled to write an IO request directed to the first cache to the second cache. In some embodiments the plurality of caches includes one or more third caches which are adapted to operate substantially independently of the first and second caches.

Typically, each of the plurality of caches is adapted to operate substantially independently of remaining caches included in the plurality.

In an embodiment, each of the plurality of caches are at an equal hierarchical level.

In an alternative embodiment all of the LAs of the second ranges include all of the LAs of the one or more mass storage devices.

In a further alternative embodiment one or more of the one or more mass storage devices, the one or more interfaces, and the plurality of caches, are implemented from an industrially available personal computer.

In some embodiments one or more of the one or more mass storage devices, the one or more interfaces, and the plurality of caches, are housed in a single housing.

There is further provided, according to an embodiment of the present invention, a storage system, including:

one or more mass storage devices, coupled to store data at respective first ranges of logical addresses (LAs);

a plurality of caches, each cache being assigned a respective second range of the LAs and being directly connected to one or more of the mass storage devices, the respective first ranges of which overlap the respective second range, so as to receive data from and provide data to the one or more mass storage devices;

one or more interfaces, which are adapted to receive input/output (IO) requests from host processors directed to specified LAs and to direct all the IO requests to the cache to which the specified LAs are assigned; and a communication channel to which the one or more interfaces and the second plurality of caches are connected, and which is adapted to convey the data and the IO requests therebetween.

In an embodiment the one or more interfaces include a mapping between the second ranges of each of the caches and the LAs and are adapted to convert the IO requests to one or more requests and to direct the one or more requests to respective one or more caches in response to the mapping.

In an alternative embodiment one of the caches is coupled to two or more mass storage devices and includes a location table providing locations of the second range of the LAs assigned to the one cache in the two or more mass storage devices.

In a further alternative embodiment the plurality of caches includes two or more caches, and the two or more caches are directly connected to one of the mass storage devices, the first range of which overlaps each of the respective second ranges of the two or more caches, so as to receive data from and provide data to the one mass storage device.

There is further provided, according to an embodiment of the present invention, a storage system, including:

one or more mass storage devices, coupled to store data at respective first ranges of logical addresses (LAs);

a plurality of caches, each cache being assigned a respective second range of the LAs and being coupled to the one or more mass storage devices, the respective first ranges of which overlap the respective second range, so as to receive data from and provide data to the one or more mass storage devices; and a plurality of interfaces, each interface being directly connected to a respective cache and being adapted to receive input/output (IO) requests from host processors directed to specified LAs and to direct all the IO requests to the cache to which the specified LAs are assigned.

The storage system typically includes a communication channel to which the one or more mass storage devices and the plurality of caches are connected, and which is adapted to convey data and the IO requests therebetween.

In an embodiment each interface includes a mapping between the second ranges of each of the caches and the LAs and is adapted to convert the IO requests to one or more requests and to direct the one or more requests to respective one or more of the caches in response to the mapping.

In an embodiment one of the caches and one of the interfaces are housed in a single housing.

In an alternative embodiment the one or more mass storage devices includes a plurality of mass storage devices, and each of the plurality of mass storage devices is directly connected to a respective cache. In a further alternative embodiment the storage system includes a plurality of single housings which respectively house a respective interface, a respective cache, and a respective mass storage device.

The one or more mass storage devices may include a multiplicity of mass storage devices, and two or more caches are directly coupled to one of the mass storage devices. In an embodiment, one of the caches and one of the interfaces are housed in a single housing.

In an embodiment the one or more storage devices include a multiplicity of mass storage devices, and each of the caches is directly connected to one or more of the multiplicity of mass storage devices. In an alternative embodiment, one of the caches is coupled to two or more mass storage devices and includes a location table providing locations in the two or more mass storage devices of the second range of the LAs assigned to the one cache.

There is further provided, according to an embodiment of the present invention, a storage system, including:

one or more mass storage devices, coupled to store data at respective first ranges of logical addresses (LAs);

a plurality of caches, each cache being assigned a respective second range of the LAs so that the LAs of all the respective second ranges comprise the LAs of all the respective first ranges;

a first communication channel to which the one or more mass storage devices and the plurality of caches are connected, and which is adapted to convey data and input/output (IO) requests therebetween;

one or more interfaces, which are adapted to receive the IO requests from host processors directed to specified LAs and to direct all the IO requests to the cache to which the specified LAs are assigned; and a second communication channel to which the one or more interfaces and the plurality of caches are connected, and which is adapted to convey the data and the IO requests therebetween.

The one or more interfaces may include a mapping between the second ranges of the caches and the LAs, and the one or more interfaces may be adapted to convert the IO requests to one or more requests and to direct the one or more requests to respective one or more of the caches in response to the mapping.

In an embodiment the plurality of caches include respective location tables, wherein each location table includes locations of the second range of the LAs assigned to the respective cache in the one or more mass storage devices.

There is further provided, according to an embodiment of the present invention, a storage system, including:

a plurality of mass storage devices, coupled to store data at respective first ranges of logical addresses (LAs);

a plurality of caches, configured to operate independently of one another, each cache being directly connected to a respective mass storage device so as to receive data from and provide data to the respective mass storage device, and being assigned the respective range of LAs of the respective mass storage device;

one or more interfaces, which are adapted to receive input/output (IO) requests from host processors directed to specified LAs and to direct all the IO requests to the cache to which the specified LAs are assigned; and a communication channel to which the one or more interfaces and the plurality of caches are connected, and which is adapted to convey data and the IO requests therebetween.

Typically, the one or more interfaces include a mapping between the plurality of caches and the LAs, and the one or more interfaces are adapted to convert the IO requests to one or more requests and to direct the one or more requests to respective one or more of the caches in response to the mapping.

There is further provided, according to an embodiment of the present invention, a network attached storage (NAS) system, including:

one or more mass storage devices, coupled to store file-based data at respective first ranges of logical addresses (LAs);

a plurality of caches, each cache being assigned a respective second range of the LAs so that the LAs of all the respective second ranges comprise the LAs of all the respective first ranges, the caches being coupled to receive file-based data from and provide file-based data to the one or more mass storage devices having LAs within the respective second range; and one or more interfaces, which are adapted to receive file-based input/output (IO) requests from host processors directed to specified LAs and to direct all the file-based IO requests to the caches to which the specified LAs are assigned.

Typically, the one or more interfaces include a file-based mapping between the plurality of caches and the LAs, and the one or more interfaces are adapted to convert the file-based IO requests to one or more file-based requests and to direct the one or more file-based requests to respective one or more of the caches in response to the file-based mapping.

There is further provided, according to an embodiment of the present invention, a storage area network (SAN) system, including:

one or more mass storage devices, coupled to store block-based data at respective first ranges of logical addresses (LAs);

a plurality of caches, each cache being assigned a respective second range of the LAs so that the LAs of all the respective second ranges comprise the LAs of all the respective first ranges, the caches being coupled to receive block-based data from and provide block-based data to the one or more mass storage devices having LAs within the respective second range; and one or more interfaces, which are adapted to receive block-based input/output (IO) requests from host processors directed to specified LAs and to direct all the block-based IO requests to the caches to which the specified LAs are assigned.

The one or more interfaces typically include a block-based mapping between the plurality of caches and the LAs, and the one or more interfaces are typically adapted to convert the block-based IO requests to one or more block-based requests and to direct the one or more block-based requests to respective one or more of the caches in response to the block-based mapping.

There is further provided, according to an embodiment of the present invention, a method for storing data, including:

coupling one or more mass storage devices to store data at respective first ranges of logical addresses (LAs);

receiving in one or more interfaces input/output (IO) requests from host processors directed to specified LAs; and coupling a plurality of caches to the one or more interfaces so as to receive the IO requests therefrom, each cache being assigned a respective second range of the LAs and being coupled to the one or more mass storage devices, the respective first ranges of which overlap the respective second range, so as to receive data from and provide data to the one or more mass storage devices, and being coupled to accept the IO requests within the respective second range directed thereto.

There is further provided, according to an embodiment of the present invention, a method for storing data in a network attached storage (NAS) system, including:

coupling one or more mass storage devices to store file-based data at respective first ranges of logical addresses (LAs);

assigning each of a plurality of caches a respective second range of the LAs so that the LAs of all the respective second ranges comprise the LAs of all the respective first ranges;

coupling the caches to receive the file-based data from and provide the file-based data to the one or more mass storage devices having LAs within the respective second range;

receiving file-based input/output (IO) requests from host processors directed to specified LAs; and directing the file-based IO requests to the caches to which the specified LAs are assigned.

There is further provided, according to an embodiment of the present invention, a method for storing data in a storage area network (SAN), including:

coupling one or more mass storage devices to store block-based data at respective first ranges of logical addresses (LAs);

assigning each of a plurality of caches a respective second range of the LAs so that the LAs of all the respective second ranges comprise the LAs of all the respective first ranges;

coupling the caches to receive the block-based data from and provide the block-based data to the one or more mass storage devices having LAs within the respective second range;

receiving block-based input/output (IO) requests from host processors directed to specified LAs; and directing the block-based IO requests to the caches to which the specified LAs are assigned.

The present invention will be more fully understood from the following detailed description of the preferred embodiments thereof, taken together with the drawings, a brief description of which is given below.

DETAILED DESCRIPTION OF PREFERRED EMBODIMENTS

Figure 1:
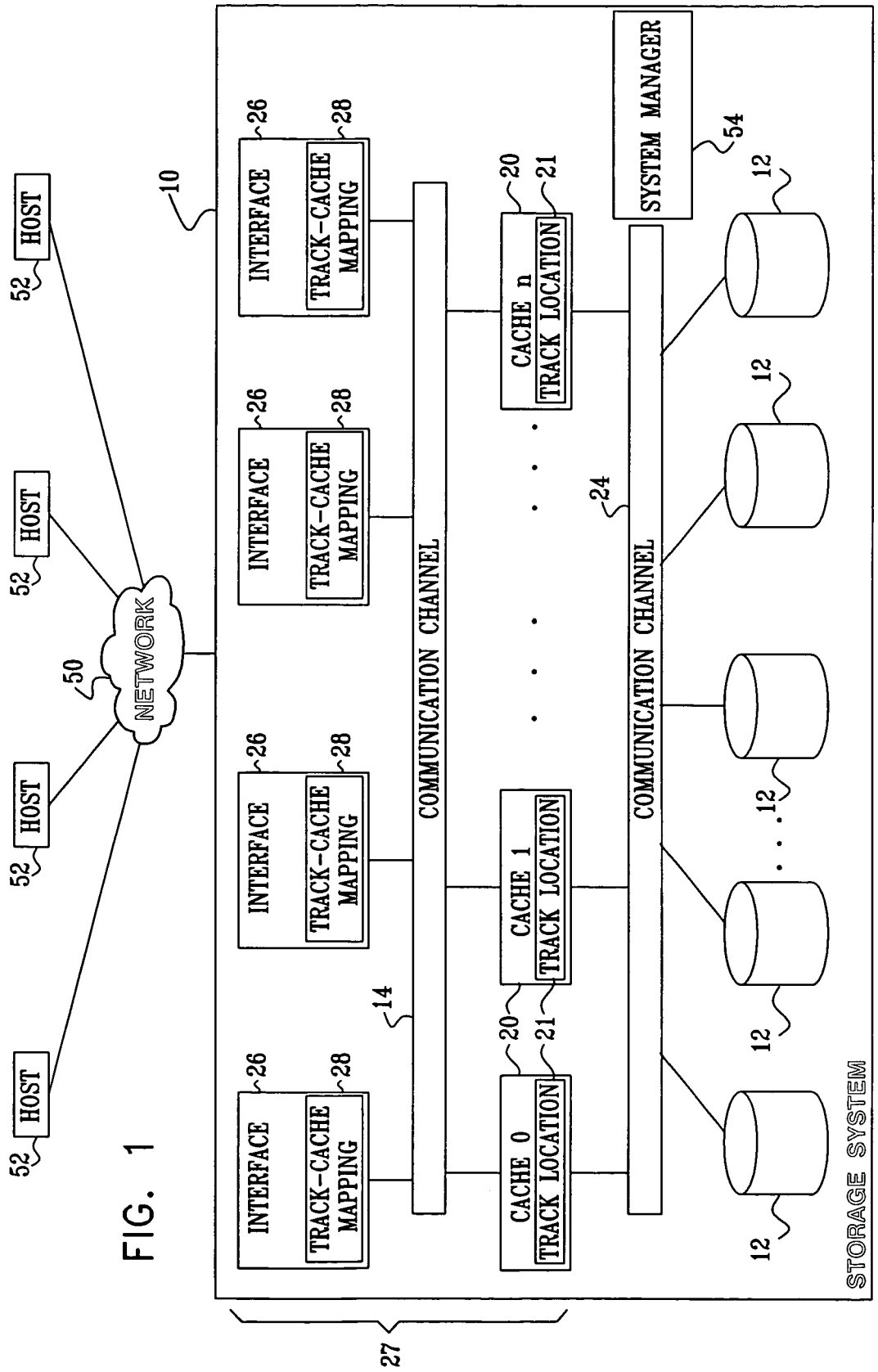
FIG. 1 is a schematic block diagram of a data storage system, according to an embodiment of the present invention.

Reference is now made to FIG. 1, which is a schematic block diagram of a storage system 10, according to an embodiment of the present invention. System 10 acts as a data memory for one or more host processors 52, which are coupled to the storage system by any means known in the art, for example, via a network such as the Internet or by a bus. Herein, by way of example, hosts 52 and system 10 are assumed to be coupled by a network 50. The data stored within system 10 is stored at logical addresses (LAs) in one or more slow access time mass storage devices, hereinbelow assumed to be one or more disks 12, by way of example, unless otherwise stated. LAs for system 10 are typically grouped into logical units (LUs) and both LAs and LUs are allocated by a system manager 54, which also acts as central control unit for the system.

System 10 is typically installed as part of a network attached storage (NAS) system, or as part of a storage area network (SAN) system, data and/or file transfer between system 10 and hosts 52 being implemented according to the protocol required by the type of system. For example, if system 10 is operative in a NAS system, data transfer is typically file based, using an Ethernet protocol; if system 10 is operative in a SAN system, data transfer is typically block based, using small computer system interface (SCSI) and fibre channel protocols. It will be appreciated, however, that embodiments of the present invention are not limited to any specific type of data transfer method or protocol. Moreover, it will be appreciated that elements of system 10 may be implemented from commercially available components. Such components include, but are not limited to, personal computers. Typically, an off-the-shelf personal computer may be used as one or more of the elements of system 10.

System 10 comprises one or more substantially similar interfaces 26 which receive input/output (IO) access requests for data in disks 12 from hosts 52. Each interface 26 may be implemented in hardware and/or software, and may be located in storage system 10 or alternatively in any other suitable location, such as an element of network 50 or one of host processors 52. Between disks 12 and the interfaces are a second plurality of interim caches 20, each cache comprising memory having fast access time, and each cache being at an equal level hierarchically. Each cache 20 typically comprises random access memory (RAM), such as dynamic RAM, and may also comprise software. Specific caches are also referred to herein as Cache 0, Cache 1, . . . , Cache n, where n is a whole number. Caches 20 are coupled to interfaces 26 by any suitable fast communication channel 14 known in the art, such as a bus or a switch, so that each interface is able to communicate with, and transfer data to and from, any cache. Herein communication channel 14 between caches 20 and interfaces 26 is assumed, by way of example, to be by a first cross-point switch. Interfaces 26 operate substantially independently of each other. Caches 20 and interfaces 26 operate as a data transfer system 27, transferring data between hosts 52 and disks 12. Except where otherwise stated below, caches 20 operate substantially independently of each other.

Caches 20 are typically coupled to disks 12 by a fast communication channel 24, typically a second cross-point switch. The coupling between the caches and the disks may be by a "second plurality of caches to first plurality of disks" coupling, herein termed an "all-to-all" coupling. Alternatively, one or more subsets of the caches may be coupled to one or more subsets of the disks. Further alternatively, the coupling may be by a "one-cache-to-one-disk" coupling, herein termed a "one-to-one" coupling, so that one cache communicates with one disk. The coupling may also be configured as a combination of any of these types of coupling. Disks 12 operate substantially independently of each other.

At setup of system 10 system manager 54 assigns a range of LAs to each cache 20. Manager 54 may subsequently reassign the ranges during operation of system, and an example of steps to be taken in the event of a change is described below with reference to FIG. 5. The ranges are chosen so that the complete memory address space of disks 12 is covered, and so that each LA is mapped to at least one cache; typically more than one is used for redundancy purposes. The LAs are typically grouped by an internal unit termed a "track," which is a group of sequential LAs, and which is described in more detail below. The assigned ranges for each cache 20 are typically stored in each interface 26 as a substantially similar table, and the table is used by the interfaces in routing IO requests from hosts 52 to the caches. Alternatively or additionally, the assigned ranges for each cache 20 are stored in each interface 26 as a substantially similar function, or by any other suitable method known in the art for generating a correspondence between ranges and caches. Hereinbelow, the correspondence between caches and ranges, in terms of tracks, is referred to as track-cache mapping 28, and it will be understood that mapping 28 gives each interface 26 a general overview of the complete cache address space of system 10.

In arrangements of system 10 comprising an all-to-all configuration, each cache 20 contains a track location table 21 specific to the cache. Each track location table 21 gives its respective cache exact location details, on disks 12, for tracks of the range assigned to the cache. Track location table 21 may be implemented as software, hardware, or a combination of software and hardware. The operations of track location table 21, and also of mapping 28, are explained in more detail below.

Figure 2:
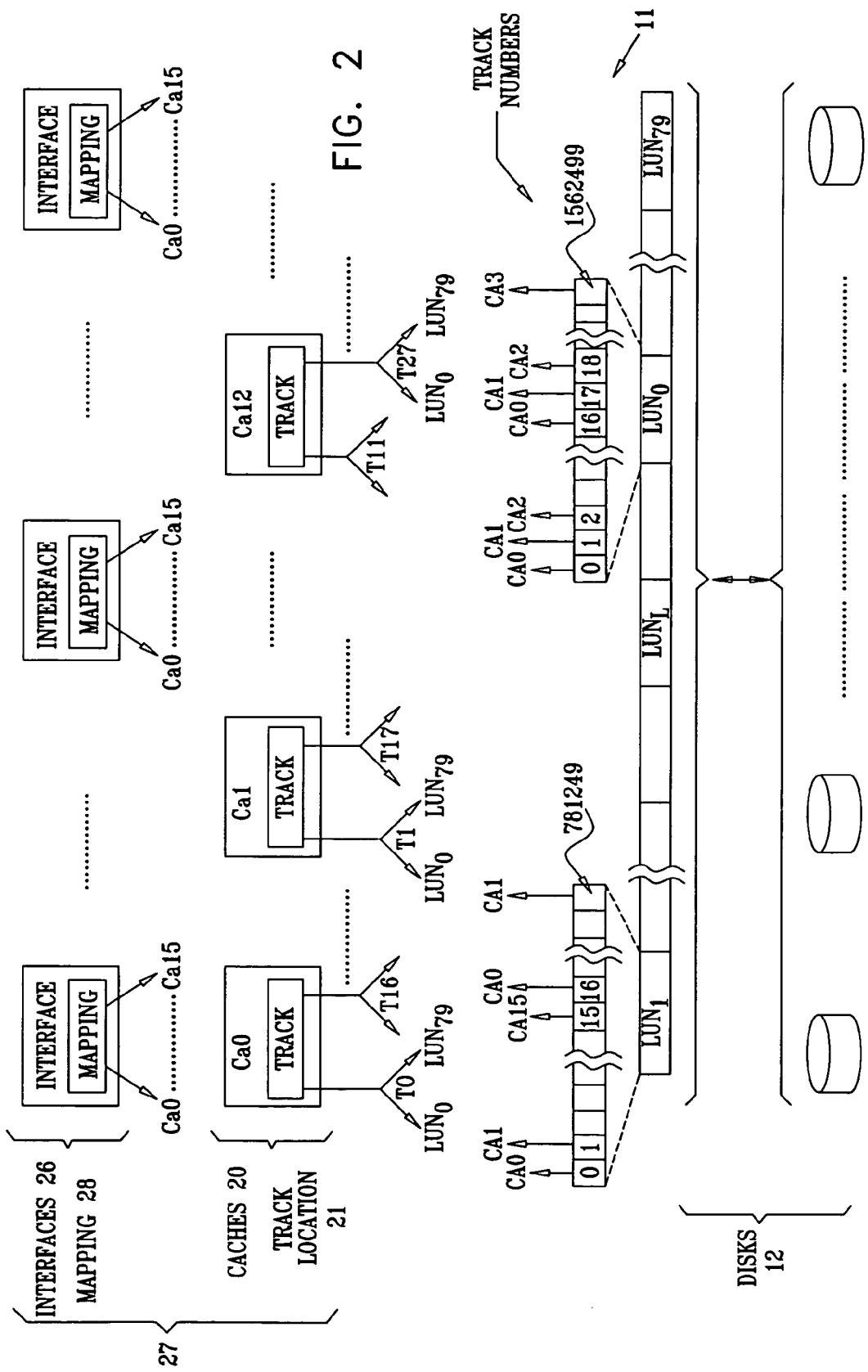
FIG. 2 is a schematic diagram illustrating a mapping of data between different elements of the system of FIG. 1 for an "all-caches-to-all-disks" configuration, according to an embodiment of the present invention.

FIG. 2 is a schematic diagram illustrating a mapping of data between different elements of system 10 when the system comprises an all-to-all configuration 11, according to an embodiment of the present invention. It will be appreciated that host processors 52 may communicate with storage system 10 using virtually any communication system known in the art. By way of example, hereinbelow it is assumed that the hosts communicate with system 10, via network 50, according to an Internet Small Computer System Interface (iSCSI) protocol, wherein blocks of size 512 bytes are transferred between the hosts and the system. The internal unit of data, i.e., the track, is defined by system manager 54 for system 10, and is herein assumed to have a size of 128 iSCSI blocks, i.e., 64 KB, although it will be appreciated that substantially any other convenient size of track may be used to group the data.

Also by way of example, system 10 is assumed to comprise 16 caches 20, herein termed Ca0, Ca1, . . . , Ca14, Ca15, and 32 generally similar disks 12, each disk having a 250 GB storage capacity, for a total disk storage of 8 TB. It will be understood that there is no requirement that disks 12 have equal capacities, and that the capacities of disks 12 have substantially no effect on the performance of caches 20. The 32 disks are assumed to be partitioned into generally similar LUs, $LU_L$, where L is an identifying LU integer from 0 to 79. The LUs include $LU_0$ having a capacity of 100 GB. Each LU is sub-divided into tracks, so that $LU_0$ comprises 100 GB/64 KB tracks i.e., 1,562,500 tracks, herein termed Tr0, Tr1, . . . , Tr1562498, Tr1562499. (Typically, as is described further below, the LAs for any particular LU may be spread over a number of disks 12, to achieve well-balanced loading for the disks.)

In system 10, each track of $LU_0$ is assigned to a cache according to the following general mapping:

$$Tr(n) \rightarrow Ca(n \bmod 16) \qquad (1)$$

where n is the track number.

Mapping (1) generates the following specific mappings between tracks and caches:

$Tr(0) \rightarrow Ca(0)$ $Tr(1) \rightarrow Ca(1)$

M $Tr(15) \rightarrow Ca(15)$ $Tr(16) \rightarrow Ca(0)$ $Tr(17) \rightarrow Ca(1)$

M $Tr(1562498) \rightarrow Ca(2)$ $Tr(1562499) \rightarrow Ca(3) \qquad (2)$

A similar mapping for each LU comprising disks 12 may be generated. For example, an $LU_1$ having a capacity of 50 GB is sub-divided into 781,250 tracks, and each track of $LU_1$ is assigned the following specific mappings:

$Tr(0) \rightarrow Ca(0)$ $Tr(1) \rightarrow Ca(1)$

M

Tr(15)→Ca(15)

Tr(16)→Ca(0)

Tr(17)→Ca(1)

M

Tr(781248)→Ca(0)

Tr(781249)→Ca(1)　　　　　　　　　　　　　　(3)

Inspection of mappings (2) and (3) shows that the tracks of $LU_0$ and of $LU_1$ are substantially evenly mapped to caches 20. In general, for any $LU_L$, a general mapping for every track in disks 12 is given by:

Tr(L,n)→Ca(n mod 16)　　　　　　　　　　　　(4)

where n is the track number of $LU_L$.

It will be appreciated that mapping (4) is substantially equivalent to a look-up table, such as Table I below, that assigns specific tracks to specific caches, and that such a look-up table may be stored in each interface in place of the mapping.

TABLE I

| L (LU identifier) | Track n (Track number) | Cache (0-15) |
|---|---|---|
| 0 | 0 | 0 |
| 0 | 1 | 1 |
| 0 | 2 | 2 |
| 0 | 3 | 3 |
| 0 | 4 | 4 |
| ... | ... | ... |
| 0 | 15 | 15 |
| 0 | 16 | 0 |
| ... | ... | ... |
| 0 | 1562498 | 2 |
| 0 | 1562499 | 3 |
| 1 | 0 | 0 |
| 1 | 1 | 1 |
| ... | ... | ... |
| 1 | 17 | 1 |
| ... | ... | ... |
| 1 | 781249 | 1 |
| ... | ... | ... |

Mapping (4) and Table I are examples of correspondences that assign each track comprised in disks 12 to a specific cache. Other examples of such assignments will be apparent to those skilled in the art. While such assignments may always be defined in terms of a look-up table such as Table I, it will be appreciated that any particular assignment may not be defined by a simple function such as mapping (4). For example, an embodiment of the present invention comprises a Table II where each track of each LU is assigned by randomly or pseudo-randomly choosing a cache between 0 and 15.

TABLE II

| L (LU identifier) | Track n (Track number) | Cache (0-15) |
|---|---|---|
| 0 | 0 | 11 |
| 0 | 1 | 0 |
| ... | ... | ... |

TABLE II-continued

| L (LU identifier) | Track n (Track number) | Cache (0-15) |
|---|---|---|
| 0 | 15 | 12 |
| 0 | 16 | 2 |
| ... | ... | ... |
| 0 | 1562498 | 14 |
| 0 | 1562499 | 13 |
| 1 | 0 | 7 |
| 1 | 1 | 5 |
| ... | ... | ... |
| 1 | 17 | 12 |
| ... | ... | ... |
| 1 | 781249 | 15 |
| ... | ... | ... |

Configurations of system 10 that include an all-to-all configuration such as configuration 11 include track location table 21 in each cache 20 of the all-to-all configuration. Track location table 21 is used by the cache to determine an exact disk location of a requested LU and track. Table III below is an example of track location table 21 for cache Ca7, assuming that mapping 28 corresponds to Table I. In Table III, the values a, b, . . . , f, . . . of the disk locations of the tracks, are allocated by system manager 54.

TABLE III

Cache Ca7

| L (LU identifier) | Track n (Track number) | Disk Location |
|---|---|---|
| 0 | 7 | a |
| 0 | 23 | b |
| ... | ... | ... |
| 0 | 1562487 | c |
| 1 | 7 | d |
| 1 | 23 | e |
| ... | ... | ... |
| 1 | 1562487 | f |
| ... | ... | ... |

Figure 3:
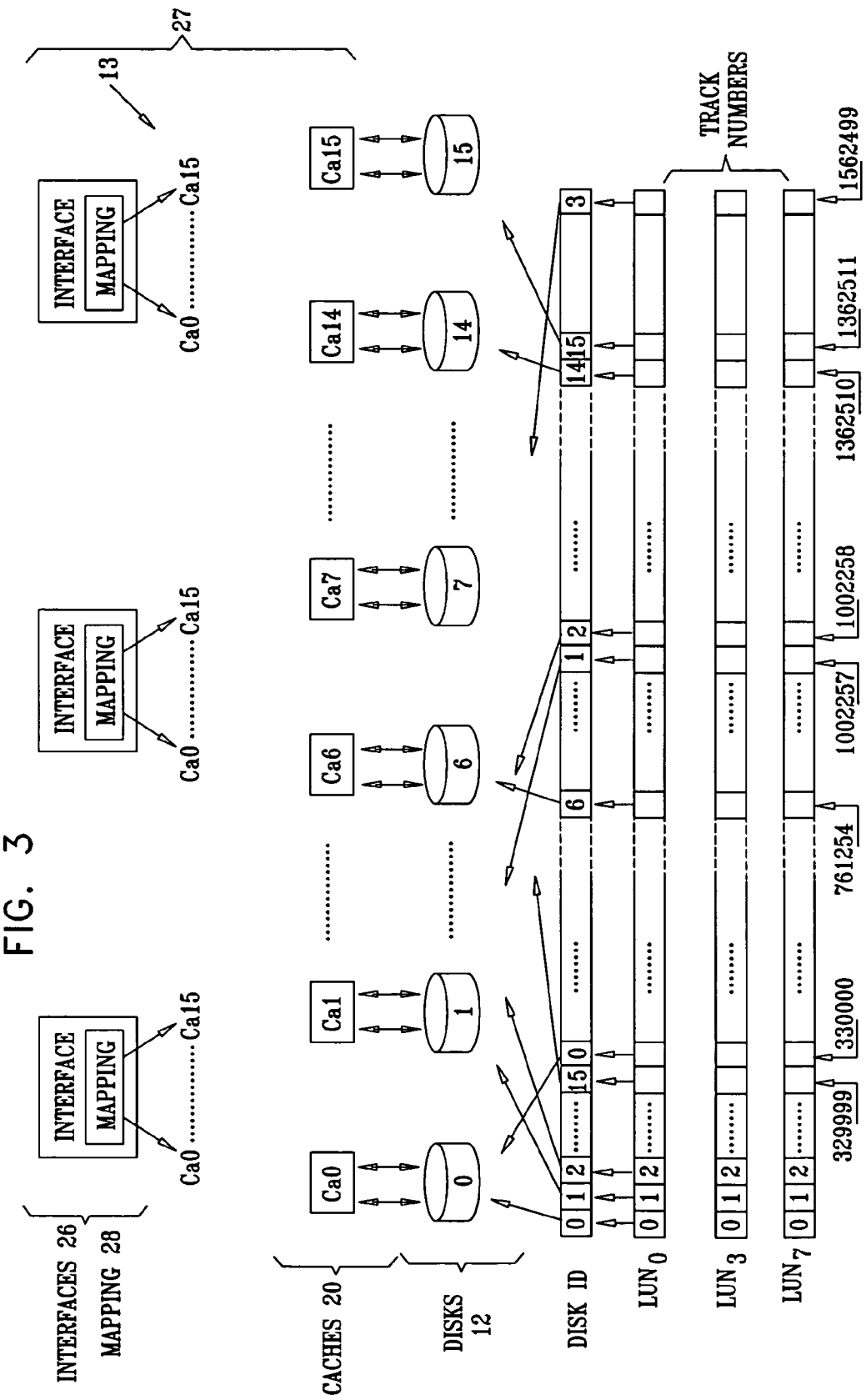
FIG. 3 is a schematic diagram illustrating a mapping of data between different elements of the system of FIG. 1 for a "one-cache-to-one-disk" configuration, according to an embodiment of the present invention.

FIG. 3 is a schematic diagram illustrating a mapping of data between different elements of system 10 when the system comprises a one-to-one configuration 13, according to am embodiment of the present invention. In one-to-one configuration 13, tracks are assigned to caches on the basis of the disks wherein the tracks originate. FIG. 3, and Table IV below, shows an example of tracks so assigned. For the assignment of each track of system 10 defined by Table IV, there are assumed to be 16 generally similar disks 12, each disk having a whole number disk identifier D range from 0 to 15 and 50 GB capacity, and each disk is assigned a cache. There are also assumed to be 8 $LU_L$, where L is an integer from 0 to 7, of 100 GB evenly divided between the disks, according to mapping (5):

Tr(L,n)→Disk(n mod 16)=Ca(n mod 16)　　　　(5)

TABLE IV

| L (LU identifier) | n (Track number) | D (Disk identifier) (0-15) | Cache (0-15) |
|---|---|---|---|
| 0-7 | 0 | 0 | 0 |
|  | 1 | 1 | 1 |
|  | 2 | 2 | 2 |
|  | ... | ... | ... |
|  | 329999 | 15 | 15 |
|  | 330000 | 0 | 0 |
|  | ... | ... | ... |
|  | 761254 | 6 | 6 |
|  | ... | ... | ... |
|  | 1002257 | 1 | 1 |
|  | 1002258 | 2 | 2 |
|  | ... | ... | ... |
|  | 1562499 | 3 | 3 |

A mapping such as mapping (4) or mapping (5), or a table such as Table I, II, or IV, or a combination of such types of mapping and tables, is incorporated into each interface 26 as its track-cache mapping 28, and spreads the LAs of the LUs substantially evenly across caches 20. The mapping used is a function of the coupling arrangement between caches 20 and disks 12. Track-cache mapping 28 is used by the interfaces to process IO requests from hosts 52, as is explained with respect to FIG. 5 below. The application titled "Data Allocation in a Distributed Storage System," describes a system for mapping LAs to devices such as caches 20 and/or disks 12, and such a system is preferably used for generating track-cache mapping 28.

To achieve well-balanced loading across caches 20, system 10 generates even and sufficiently fine "spreading" of all the LAs over the caches, and it will be appreciated that track-cache mapping 28 enables system 10 to implement the even and fine spread, and thus the well-balanced loading. For example, if in all-to-all configuration 11, or in one-to-one configuration 13, caches 20 comprise substantially equal capacities, it will be apparent that well-balanced loading occurs. Thus, referring back to mapping (1), statistical considerations make it clear that the average IO transaction related with the LAs of $LU_0$ is likely to use evenly all the 16 caches available in the system, rather than any one of them, or any subset of them, in particular. This is because $LU_0$ contains about 1.5 million tracks, and these tracks are now spread uniformly and finely across all 16 caches, thus yielding a well-balanced load for the IO activity pertaining to the caches, as may be true in general for any system where the number of tracks is far greater than the number of caches. Similarly, spreading LAs evenly and sufficiently finely amongst disks 12 leads to well-balanced IO activity for the disks.

An example of a configuration with unequal cache capacities is described with reference to FIG. 4.

Figure 4:
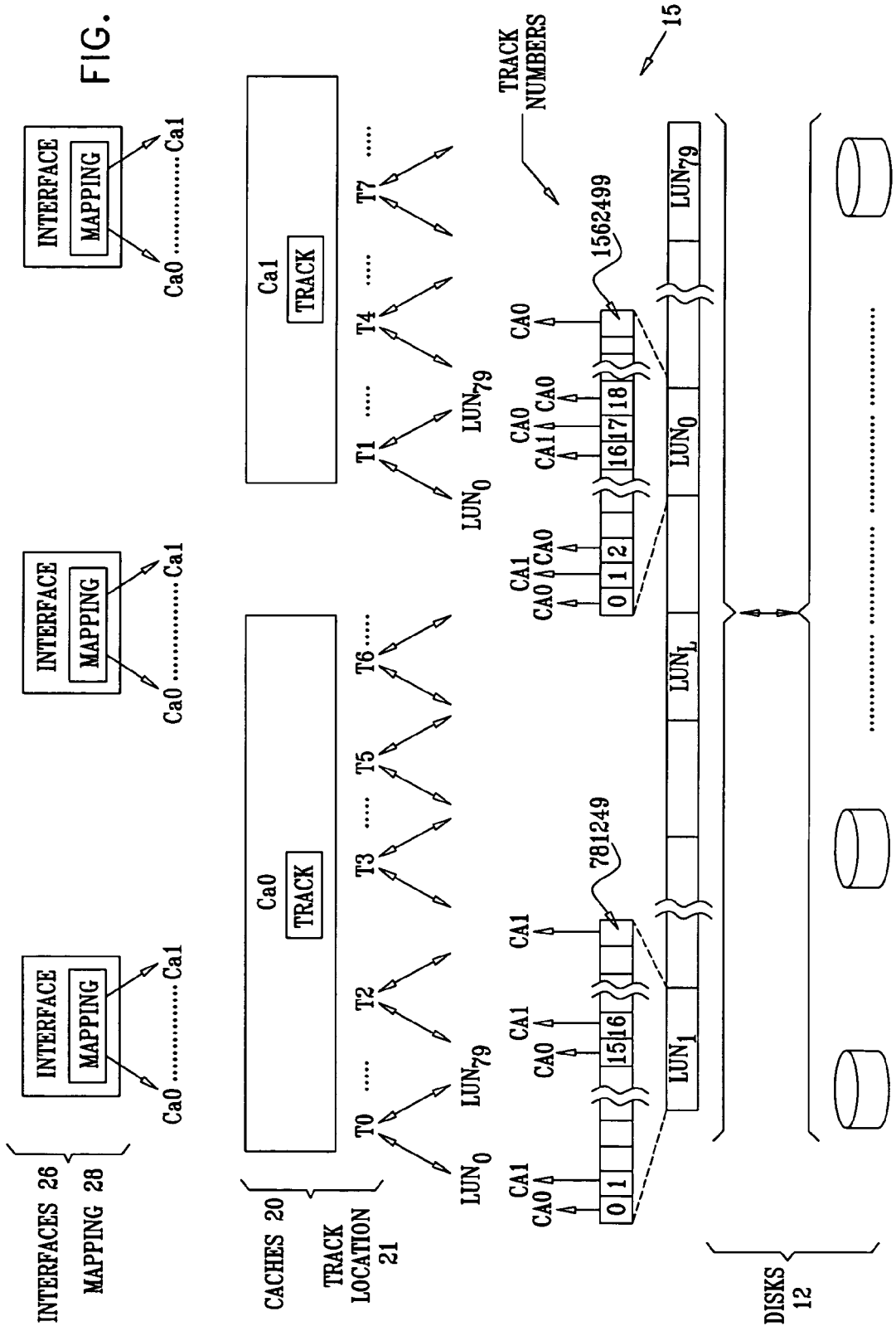
FIG. 4 is a schematic diagram illustrating a mapping of data between different elements of the system of FIG. 1 for an alternative "all-caches-to-all-disks" configuration, according to an embodiment of the present invention.

FIG. 4 is a schematic diagram illustrating a mapping of data between different elements of system 10 when the system comprises an alternative all-to-all configuration 15, according to an embodiment of the present invention. Apart from the differences described below, configuration 15 is generally similar to configuration 11, so that elements indicated by the same reference numerals in both configurations are generally identical in construction and in operation. All-to-all configuration 15 comprises two caches 20, herein termed Ca0 and Ca1, Ca0 having approximately twice the capacity of Ca1.

Track-cache mapping 28 is implemented as mapping (6) below, or as Table V below, which is derived from mapping (6).

$$Tr(L,n) \to Ca[(n \bmod 3) \bmod 2] \quad (6)$$

where n is the track number of $LU_L$.

TABLE V

| L (LU identifier) | n (Track number) | Cache (0-1) |
|---|---|---|
| 0 | 0 | 0 |
| 0 | 1 | 1 |
| 0 | 2 | 0 |
| 0 | 3 | 0 |
| 0 | 4 | 1 |
| 0 | 5 | 0 |
| 0 | 6 | 0 |
| ... | ... | ... |
| 0 | 15 | 0 |
| 0 | 16 | 1 |
| 0 | 17 | 0 |
| 0 | 18 | 0 |
| ... | ... | ... |
| 0 | 1562499 | 0 |
| 1 | 0 | 0 |
| 1 | 1 | 1 |
| ... | ... | ... |
| 1 | 15 | 0 |
| 1 | 16 | 1 |
| 1 | 17 | 0 |
| ... | ... | ... |
| 1 | 781249 | 1 |
| ... | ... | ... |

Mapping 28 is configured to accommodate the unequal capacities of Ca0 and Ca1 so that well-balanced loading of configuration 15 occurs.

By the inspection of the exemplary mappings for configurations 11, 13, and 15, it will be appreciated that mapping 28 may be configured to accommodate caches 20 in system 10 having substantially any capacities, so as to maintain substantially well-balanced loading for the system. It will also be appreciated that the loading generated by mapping 28 is substantially independent of the capacity of any specific disk in system 10, since the mapping relates caches to tracks.

Figure 5:
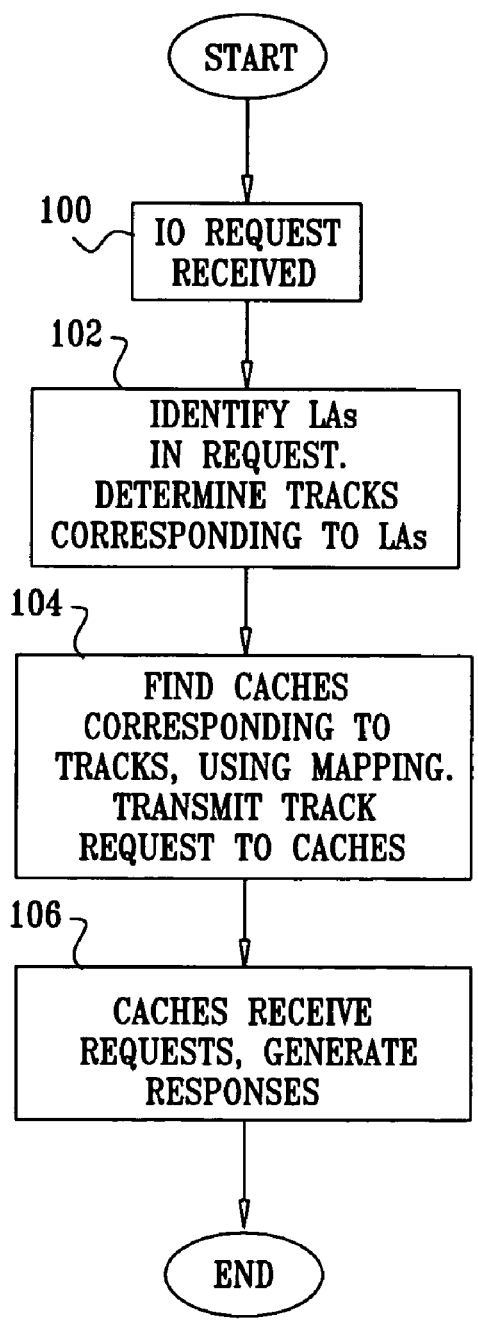
FIG. 5 is a flow chart showing steps followed by the system of FIG. 1 on receipt of an input/output request from a host communicating with the system, according to an embodiment of the present invention.

FIG. 5 is a flow chart showing steps followed by system 10 on receipt of an IO request from one of hosts 52, according to an embodiment of the present invention. Each IO request from a specific host 52 comprises several parameters, such as whether the request is a read or a write command, the LU to which the request is addressed, the first LA requested, and a number of blocks of data included in the request.

In an initial step 100, the IO request is transmitted to system 10 in one or more packets according to the protocol under which the hosts and the system are operating. The request is received by system 10 at one of interfaces 26, herein, for clarity, termed the request-receiving interface (RRI).

In a track identification step 102, the RRI identifies from the request the LAs from which data is to be read from, or to which data is to be written to. The RRI then determines one or more tracks corresponding to the LAs which have been identified.

In a cache identification step 104, the RRI refers to its mapping 28 to determine the caches corresponding to tracks determined in the third step. For each track so determined, the RRI transfers a respective track request to the cache corresponding to the track. It will be understood that each track request is a read or a write command, according to the originating IO request.

In a cache response 106, each cache 20 receiving a track request from the RRI responds to the request. The response is a function of, inter alia, the type of request, i.e., whether the track request is a read or a write command and whether the request is a "hit" or a "miss." Thus, data may be written to the LA of the track request from the cache and/or read from the LA to the cache. Data may also be written to the RRI from the cache and/or read from the RRI to the cache. If system 10 comprises an all-to-all configuration, and the response includes writing to or reading from the LA, the cache uses its track location table 21 to determine the location on the corresponding disk of the track for the LA.

The flow chart of FIG. 5 illustrates that there is virtually no management activity of system 10 once an IO request has reached a specific interface 26. This is because the only activity performed by the interface is, as described above for steps 102 and 104, identifying track requests and transmitting the track requests to their respective caches 20. Similarly, each cache 20 operates substantially independently, since once a track request reaches its cache, data is moved between the cache and the interface originating the request, and between the cache and the required disk, as necessary, to service the request.

Figure 6:
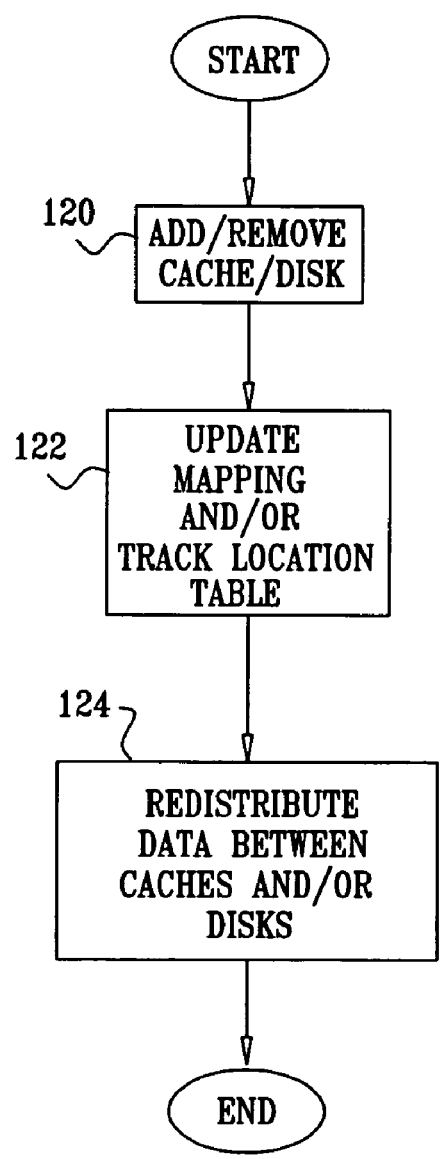
FIG. 6 is a flow chart showing steps followed by the system of FIG. 1 on addition or removal of a cache or disk to/from the system, according to an embodiment of the present invention.

FIG. 6 is a flow chart showing steps followed by system 10 on addition or removal of a cache or disk from system 10, according to an embodiment of the present invention. In a first step 120, a cache or disk is added or removed from system 10. In an update step 122, system manager 54 updates mapping 28 and/or track location table 21 to reflect the change in system 10. In a redistribution step 124, system manager 54 redistributes data on disks 12, if the change has been a disk change, or data between caches 20, if the change is a cache change. The redistribution is according to the updated mapping 28, and it will be understood that the number of internal IO transactions generated for the redistribution is dependent on changes effected in mapping 28. Once redistribution is complete, system 10 then proceeds to operate as described with reference to FIG. 4. It will thus be apparent that system 10 is substantially perfectly scalable.

Referring back to FIGS. 1, 2, and 3, redundancy for caches 20 and/or disks 12 may be easily incorporated into system 10. The redundancy may be implemented by modifying track-cache mapping 28 and/or track location table 21, so that data is written to more than one cache 20, and may be read from any of the caches, and also so that data is stored on more than one disk 12.

Mapping (7) below is an example of a mapping, similar to mapping (4), that assigns each track to two caches 20 of the 16 caches available, so that incorporating mapping (7) as track-cache mapping 28 in each interface 26 will form a redundant cache for each cache of system 10.

$$Tr(L, n) \rightarrow \begin{cases} Ca(n \bmod 8) \\ Ca(7 + n \bmod 8) \end{cases} \quad (7)$$

In processing an IO request, as described above with reference to FIG. 5, the interface 26 that receives the IO request may generate a track request (cache identification step 104) to either cache defined by mapping (7).

Table VI below is an example of a table for cache Ca7, similar to Table III above, that assumes each track is written to two separate disks 12, thus incorporating disk redundancy into system 10. The specific disk locations for each track are assigned by system manager 54. A table similar to Table VI is incorporated as track location table 21 into each respective cache 20.

TABLE VI

| Cache Ca7 | | |
|---|---|---|
| Track | | |
| L (LU identifier) | n (Track number) | Disk Location |
| 0 | 7 | a1, a2 |
| 0 | 23 | b1, b2 |
| ... | ... | ... |
| 0 | 1562487 | c1, c2 |
| 1 | 7 | d1, d2 |
| 1 | 23 | e1, e2 |
| ... | ... | ... |
| 1 | 1562487 | f1, f2 |
| ... | ... | ... |

As described above with reference to cache response step 106 (FIG. 5), the cache that receives a specific track request may need to refer to track location table 21. This reference generates a read or a write, so that in the case of Table VI, the read may be to either disk assigned to the specific track, and the write is to both disks.

It will be appreciated that other forms of redundancy known in the art, apart from those described above, may be incorporated into system 10. For example, a write command to a cache may be considered to be incomplete until the command has also been performed on another cache. All such forms of redundancy are assumed to be comprised within the present invention.

As stated above with reference to FIG. 1, disks 12 (FIGS. 1-4) are examples of mass storage devices, and it will be appreciated that other mass storage devices may be used in embodiments of the present invention. In the configurations described above, as well as those in the following description, it will thus be understood that a mass storage device may comprise one or more disks, one or more redundant arrays of independent disks (RAIDs), one or more optical storage devices, one or more non-volatile random access memories (RAMs), or combinations of such devices.

FIGS. 7-14 below are illustrative of configurations of storage systems, other than those represented by FIG. 1 and FIG. 3. Apart from the differences described below, the functioning of the systems of FIGS. 7-14 is generally similar to that of system 10, such that elements indicated by the same terms and reference numerals within the systems of FIGS. 7-14, and in system 10, are generally identical in construction and in operation. It will be understood that the configurations of FIGS. 7-14 may be implemented using substantially any data transfer method; such methods include, but are not limited to, operation in a SAN or a NAS system. It will also be understood that, as for the configurations of FIGS. 1 and 3, the configurations of FIGS. 7-14 may be implemented using commercially available components, including, but not limited to, personal computers.

In operating as a SAN system, data transfer is typically block-based, and caches such as caches 20 are coupled to transfer block-based data between the mass storage devices where the data is stored. In the SAN system, interfaces 26 are typically adapted to receive block-based IO requests from host processors such as hosts 52. As described above, the interfaces convert the block-based IO requests to internal block-based requests which are directed to the appropriate cache.

In operating as a NAS system, data transfer is typically file-based, and caches such as caches 20 are coupled to transfer file-based data between the mass storage devices where the data is stored. In the NAS system, interfaces 26 are typically adapted to receive file-based IO requests from host processors such as hosts 52. It will be understood that the interfaces may then convert the file-based IO requests to internal file-based requests which are directed to the appropriate cache.

Figure 7:
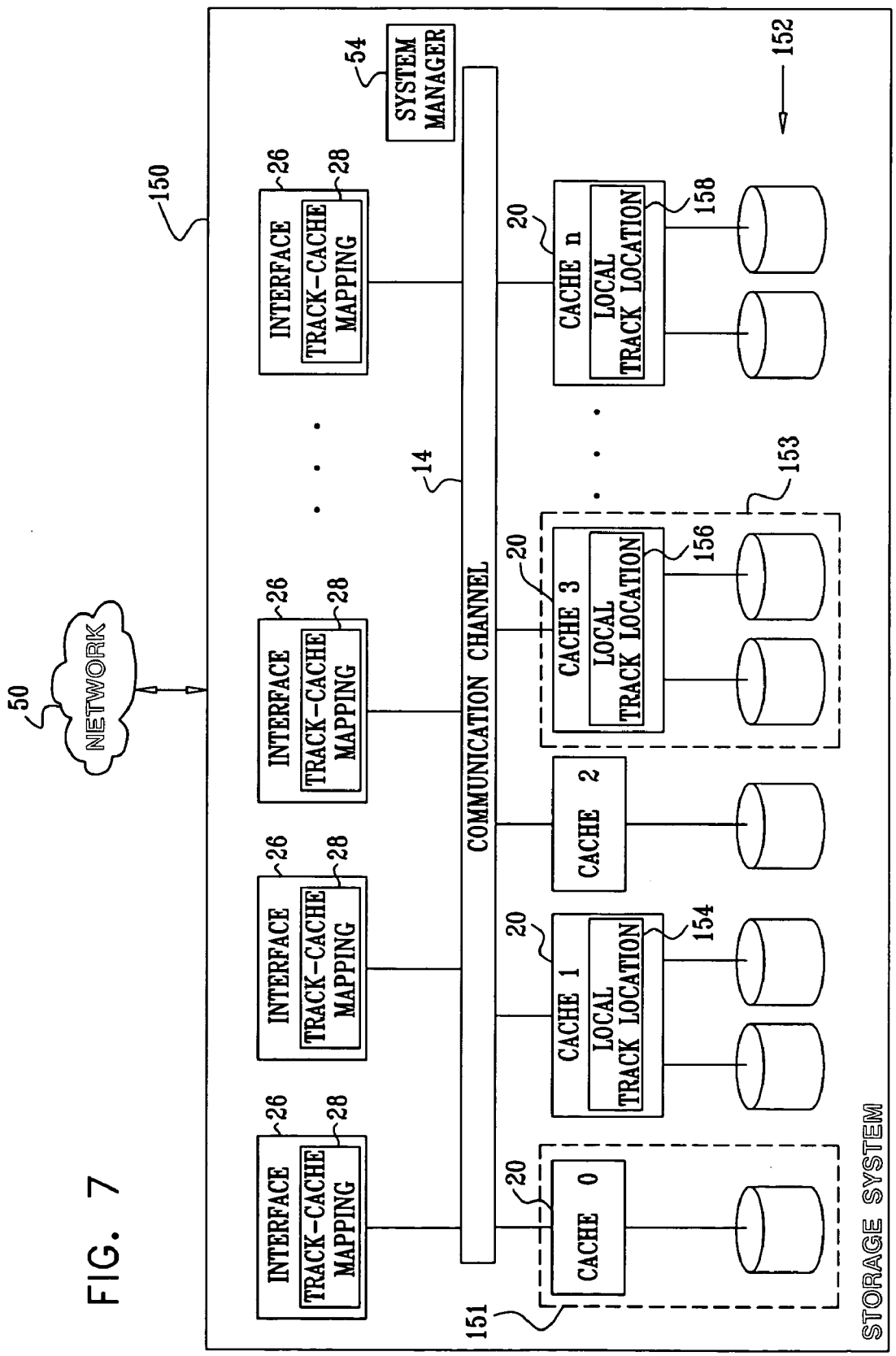
FIG. 7 is a schematic block diagram of a configuration of the system of FIG. 1, according to an embodiment of the present invention.

FIG. 7 is a schematic block diagram of a storage system 150, according to an embodiment of the present invention. In storage system 150, each cache 20 may be coupled directly to one or more mass storage devices 152. In cases when a specific cache 20 is coupled to one device 152—corresponding to a one-one configuration such as described in more detail with respect to FIG. 3 above—the tracks assigned to the cache correspond to those of the mass storage device to which the cache is attached.

In cases when a specific cache 20 is coupled to more than one device 152, the respective cache comprises a local track location table. This is exemplified by local track location tables 154, 156, and 158, which respectively tabulate track locations on two, three, and two mass storage devices coupled to their respective caches 20. Local track location tables 154, 156, and 158 are generally similar to track location tables 21 described above, but map exact location details for the tracks of the specific mass storage devices device attached to a particular cache 20.

In configurations such as that exemplified by system 150, separation of the interfaces from the cache-mass storage devices allows for flexibility in locating the interfaces relative to the cache-mass storage devices. For example, the interfaces may be located in one or more devices physically distant from the cache-mass storage devices. By enabling each cache to be coupled to more than one mass storage device, further flexibility is available for the system, such as the ability to provide local redundancy for the devices coupled to a specific cache.

In some embodiments of the present invention, each cache 20 is housed together with its directly coupled one or more mass storage device, in a single housing such as housings 151 and 153. Typically the single housing is at least part of a personal computer. By coupling the cache and the one or more storage devices directly, there are no communication overheads such as are present with a switch, and there is an extremely large bandwidth between the storage devices and the cache.

Figure 8:
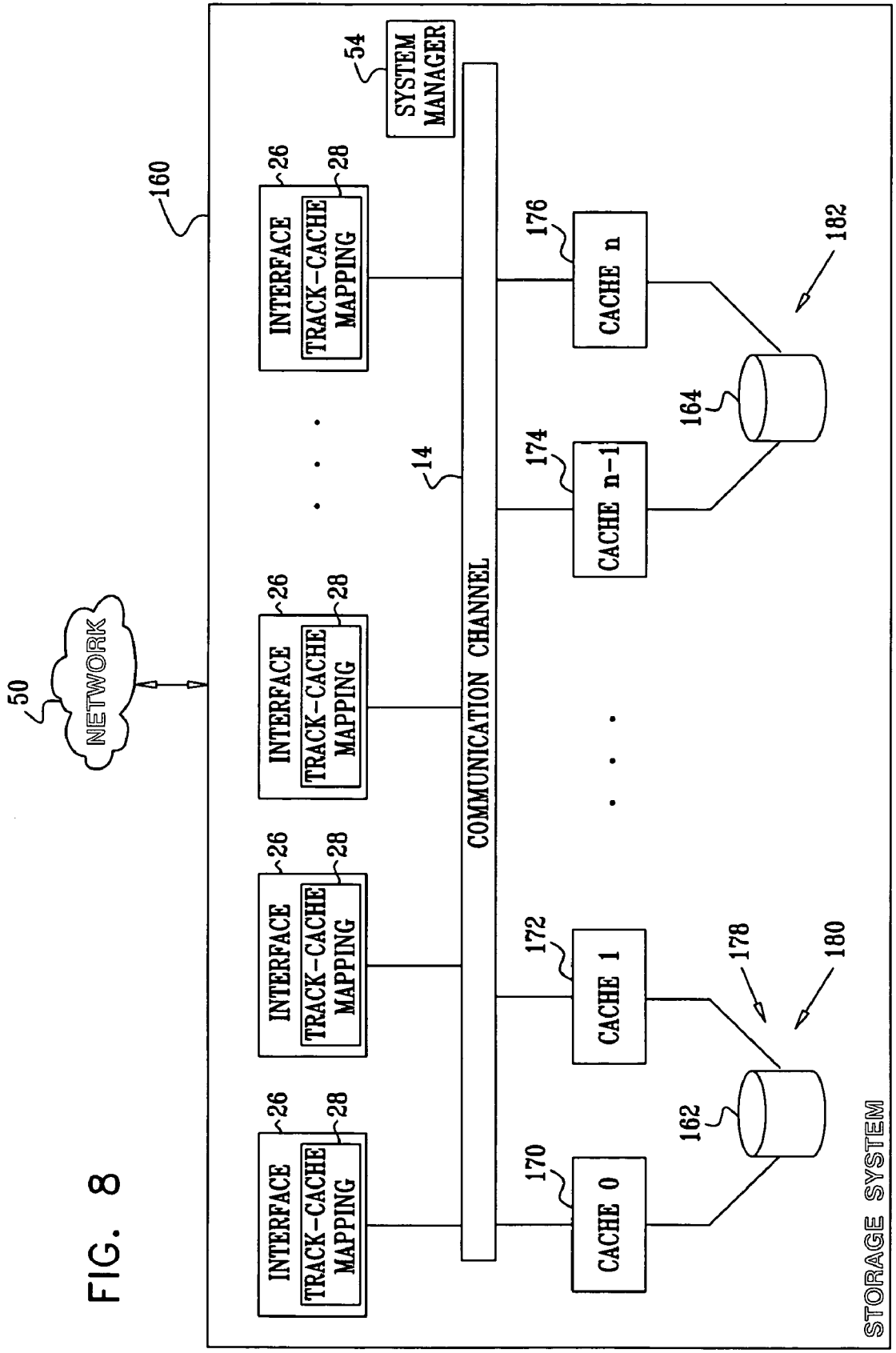
FIG. 8 is a schematic block diagram of an alternative configuration of the system of FIG. 1, according to an embodiment of the present invention.

FIG. 8 is a schematic block diagram of a storage system 160, according to an embodiment of the present invention. In storage system 160, more than one cache is coupled to each single mass storage device. By way of example, caches 170 and 172 are coupled to a single mass storage device 162, and caches 174 and 176 are coupled to a single mass storage device 164. Each of caches 170, 172, 174, and 176 is substantially similar to cache 20. Single mass storage device 162 comprises a single physical device which is divided into two logical partitions 178 and 180 which communicate respectively with cache 170 and cache 172.

Single mass storage device 164 comprises a single physical device having one logical partition 182, and both cache 170 and cache 172 communicate with the one partition. System manager 54 and/or central processing units within the caches are implemented to track input/output requests to logical partition 182 so as to avoid conflicts. The implementation is typically in a "dual-write" format, described in more detail below with reference to FIG. 13.

In the caches attached to device 162 and to device 164, the tracks assigned to a specific cache correspond to those of the logical partition with which the cache communicates.

In configurations such as system 160, separation of the interfaces from the cache-mass storage devices provides the same advantages as described for system 150. In addition, by coupling more than one cache to each mass storage device, the system benefits from improved data throughput and/or cache redundancy.

Figure 9:
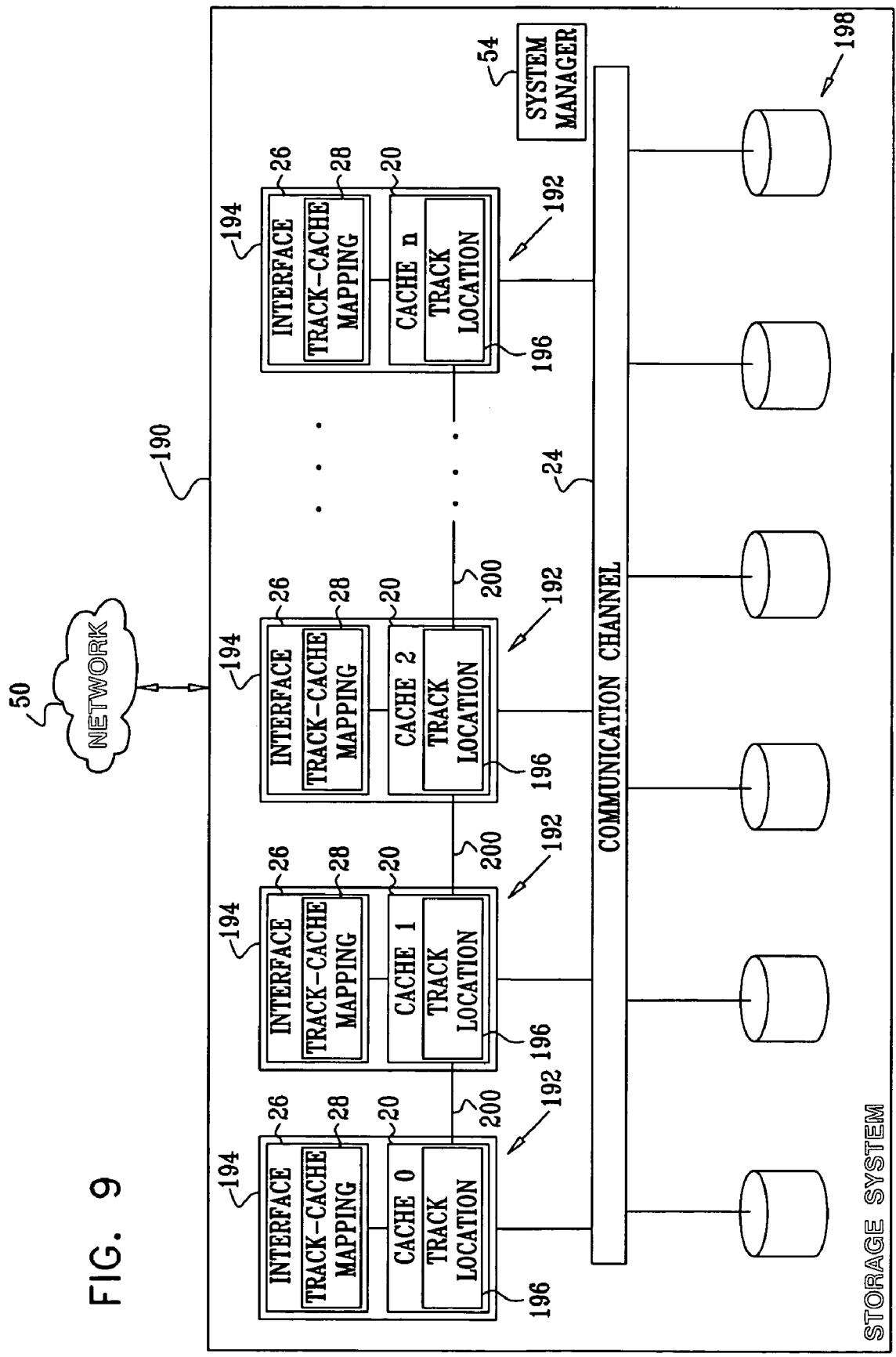
FIG. 9 is a schematic block diagram of a further alternative configuration of the system of FIG. 1, according to an embodiment of the present invention.

FIG. 9 is a schematic block diagram of a storage system 190, according to an embodiment of the present invention. Each interface 26 is coupled to a respective cache 20 to form an interface-cache pair 192, and each interface-cache pair is typically housed within a single housing 194. The interface-cache pairs are coupled via channel 24 to mass storage devices 198. Each cache 20 comprises a track location table 196, substantially similar to track location tables 21 described above, each table 196 giving its respective cache exact location details on devices 198 for tracks of the range assigned to the cache. It will be appreciated that the cache—mass storage device arrangement of system 190 corresponds to the "all-to-all" configuration described above.

Each cache 20 is implemented to communicate with other caches 20, typically via a communication channel 200, such as a bus, to which all the caches are coupled. An I/O request to a specific interface 26 is routed from the specific interface, using the interface's track-cache mapping 28. If the cache 20 to which the request is routed is the cache coupled directly to the interface, the request is conveyed directly to the cache. If the cache 20 to which the request is routed is another cache, the request is routed to the other cache via channel 200. Typically the routing may be implemented using a central processing unit comprised in the interface-cache pair 192 which receives the request. Alternatively or additionally, the routing may be implemented by system manager 54.

In configurations such as that of system 190, housing an interface unit with a cache may provide extremely fast response to IO requests directed to the specific interface-cache combination. The overall ability of the system to respond to any IO request is maintained by the coupling between the caches. In addition, by separating the interface-cache combinations from the mass storage devices, the two combinations and the devices may be isolated, so that, for example, maintenance/removal/addition of a mass storage device has no effect on any other part of the system.

Furthermore, interface-cache pairs 192, in respective housings 194, may be conveniently implemented from an off-the-shelf personal computer, typically leading to significant savings in cost compared to separate provision of the components. Other advantages to such an implementation include reduced maintenance, reduced power consumption, and reduced communication overhead. In addition, memory comprised in the personal computer may be allocated flexibly between the interface 26 and the cache 20 of the interface-cache pair.

Figure 10:
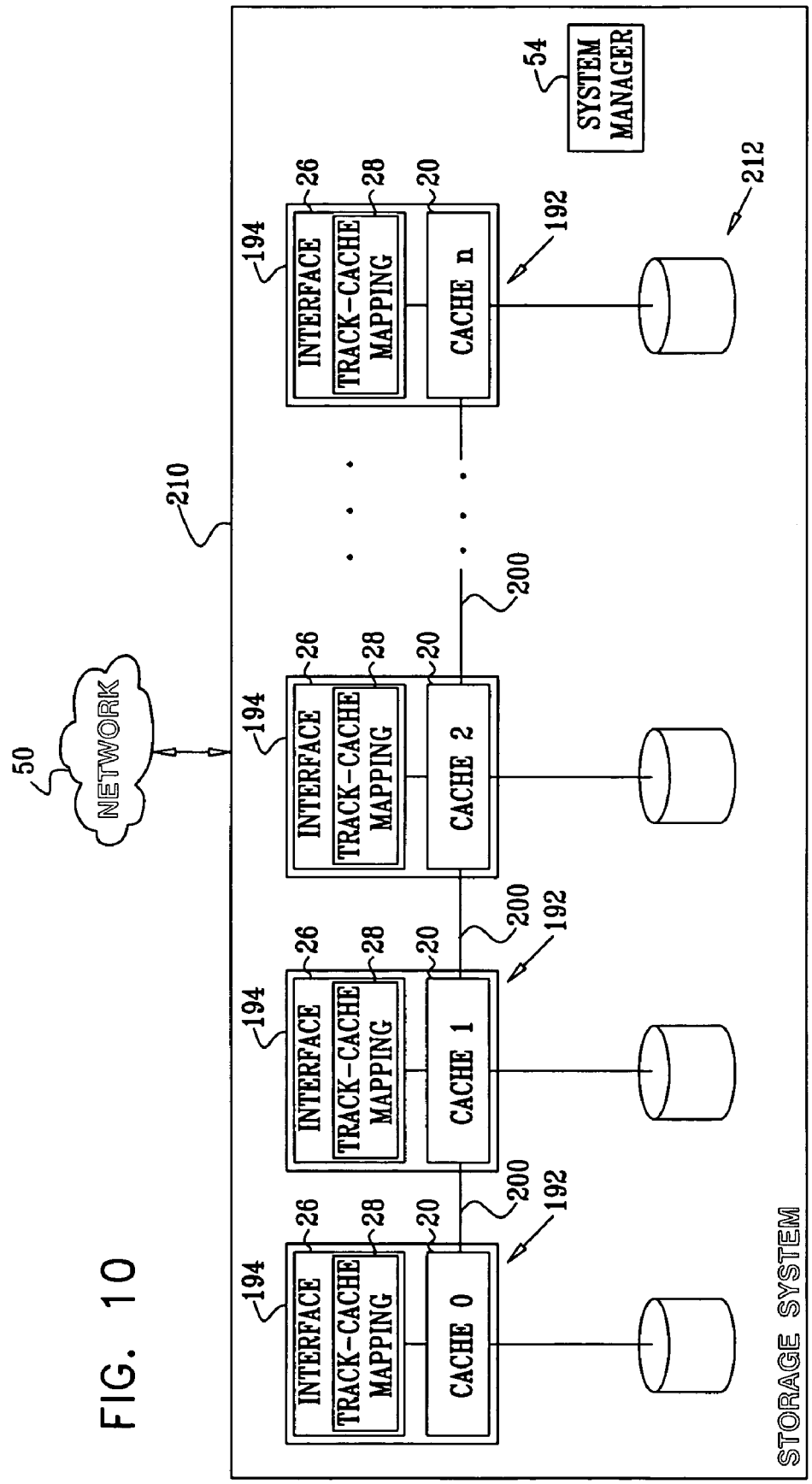
FIG. 10 is a schematic block diagram of a yet further alternative configuration of the system of FIG. 1, according to an embodiment of the present invention.

FIG. 10 is a schematic block diagram of a storage system 210, according to an embodiment of the present invention. Storage system 210 comprises a plurality of interface-cache pairs 192, typically housed in respective housings 194 and coupled by communication channel 200 as described above with reference to FIG. 9. Each interface-cache pair 192 is coupled directly to a respective single mass storage device 212, so that there are no track location tables 196 in caches 20. Rather, as described above with reference to FIG. 3, there is a one-one configuration wherein the tracks assigned to each cache correspond to those of the mass storage device to which the cache is attached. In some embodiments of system 210, each mass storage device 212 is included within a respective housing 194 of the interface-cache pair to which it is coupled. Such an interface-cache-mass storage device combination may be advantageously implemented from an off-the-shelf personal computer.

An I/O request to a specific interface 26 is routed from the specific interface, using the interface's track-cache mapping 28, as described above with reference for system 190.

In configurations such as that exemplified by system 210, the interface-cache-mass storage device combination may operate as a "local" storage system, enabling local IO requests directed to a local mass storage device to be handled quickly. The ability of any local interface-cache-mass storage device combination to respond to any IO request is maintained by the coupling between the caches. It will be appreciated that in addition to the advantages described above (with reference to FIG. 9) in implementing interface-cache pairs 192, the one-one configuration of system 210 has extremely high cache-mass storage device bandwidth.

Figure 11:
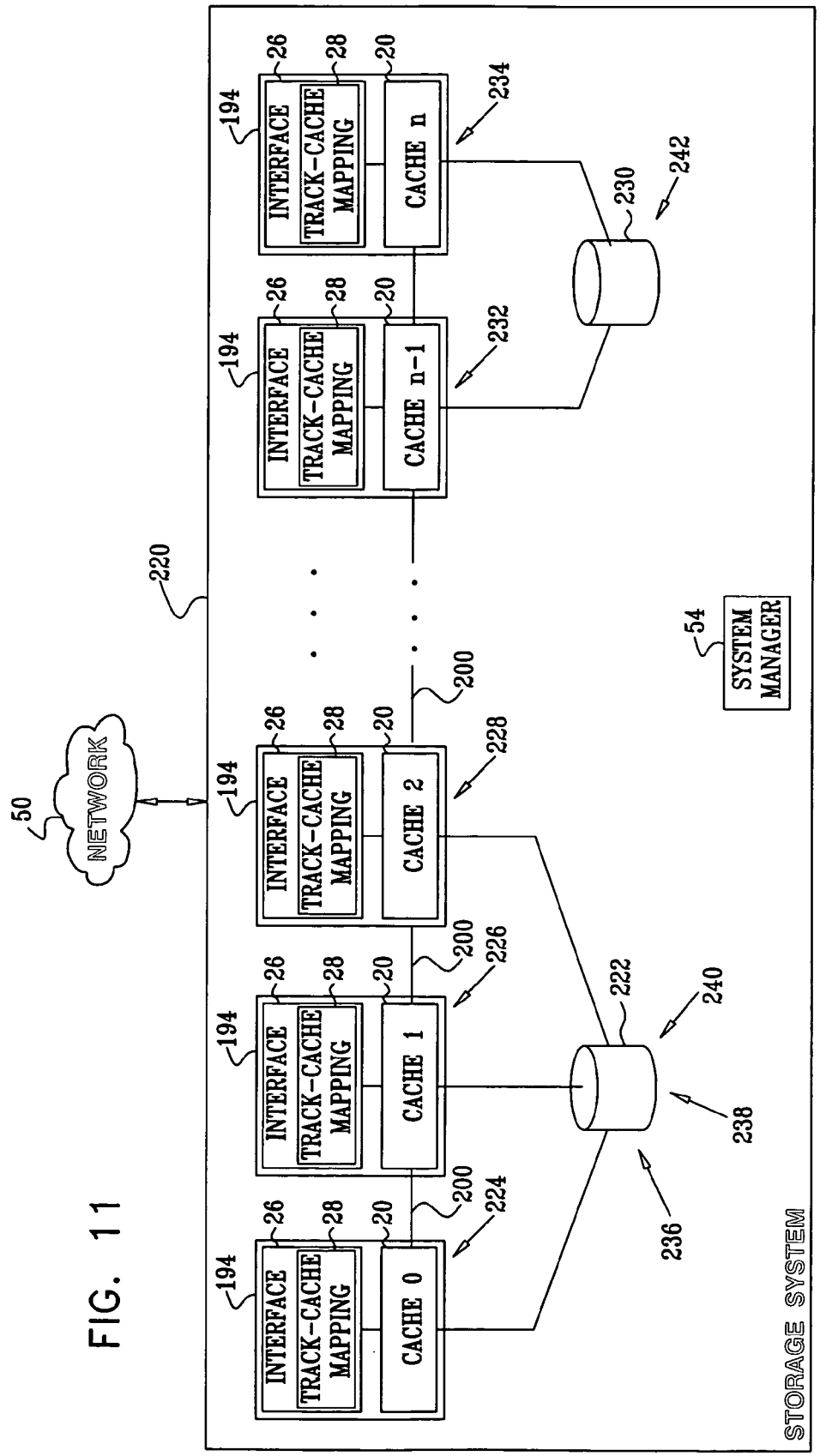
FIG. 11 is a schematic block diagram of another configuration of the system of FIG. 1, according to an embodiment of the present invention.

FIG. 11 is a schematic block diagram of a storage system 220, according to an embodiment of the present invention. Storage system 220 comprises interface-cache pairs coupled by communication channel 200, as described above with reference to FIG. 9. In storage system 220, each single mass storage device is coupled to more than one interface-cache pair. By way of example, a single mass storage device 222 is coupled to three interface-cache pairs 224, 226, and 228, and a single mass storage device 230 is coupled to two interface-cache pairs 232 and 234. Each interface-cache pair 224, 226, 228, 232, and 234 is substantially the same as interface-cache pair 192, described above, and is typically housed in a respective housing 194.

Single mass storage device 222 comprises a single physical device which is divided into three logical partitions 236, 238 and 240 which communicate respectively with interface-cache pairs 224, 226, and 228.

Single mass storage device 230 comprises a single physical unit having one logical partition 242, and both interface-cache pairs 232 and 234 communicate with the one partition. System manager 54 and/or central processing units within the interface-cache pairs are implemented to track input/output requests to logical partition 242 so as to avoid conflicts. The implementation is typically in a dual-write format.

In the caches attached to device 222 and to device 230, the tracks assigned to a specific cache correspond to those of the logical partition with which the cache communicates.

In configurations such as that exemplified by system 220, connecting more than one interface-cache combination to a single mass storage device provides all the connected interfaces with the ability to quickly access the single mass storage device. Such a configuration extends the local storage system advantages of system 210, so that multiple interfaces, each with a respective cache, may operate in a local mode. The overall ability of any interface-cache combination to respond to any IO request is maintained by the coupling between the caches.

Figure 12:
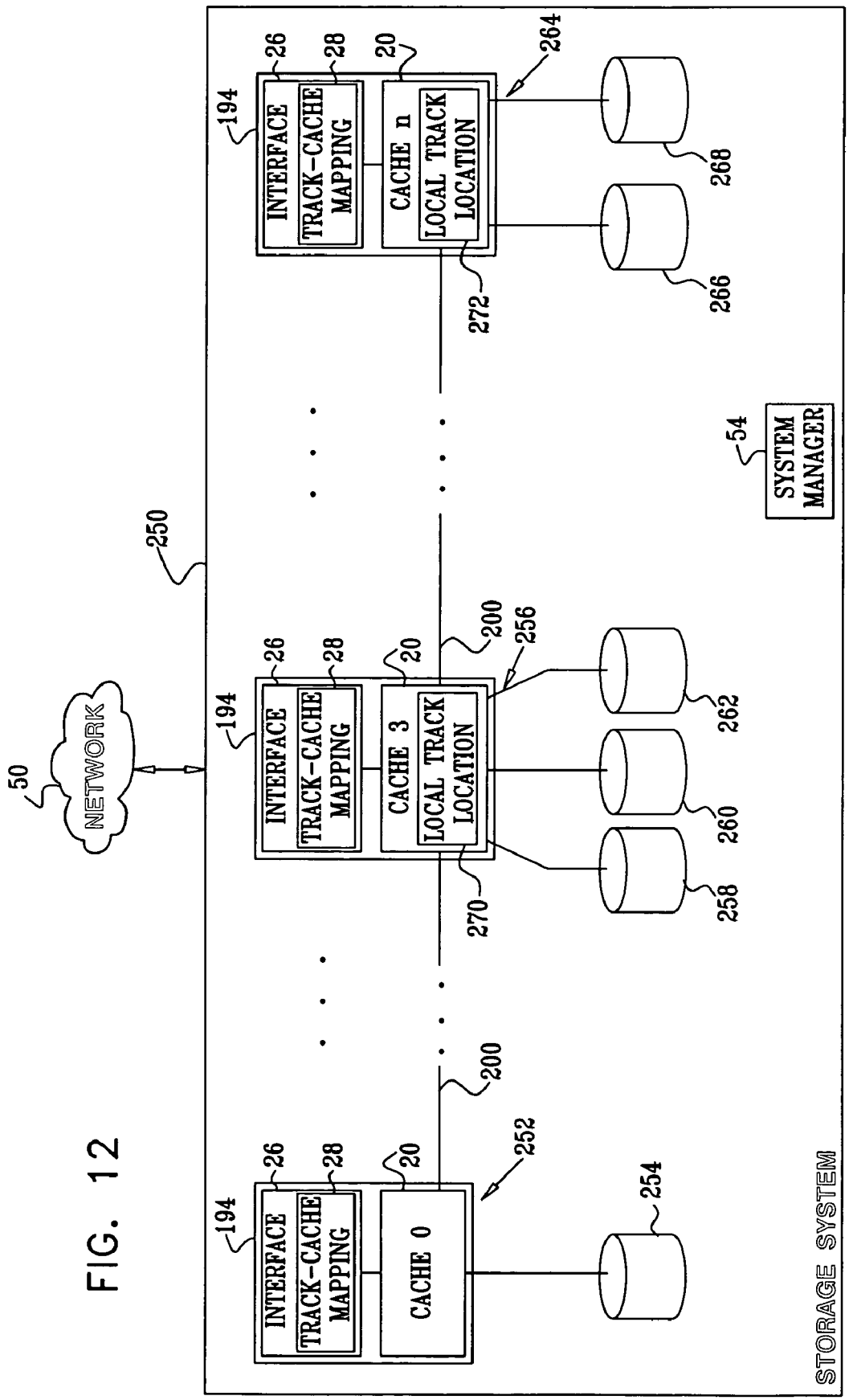
FIG. 12 is a schematic block diagram of another alternative configuration of the system of FIG. 1, according to an embodiment of the present invention.

FIG. 12 is a schematic block diagram of a storage system 250, according to an embodiment of the present invention. Storage system 250 comprises interface-cache pairs coupled by communication channel 200, as described above with reference to FIG. 9. In storage system 250, each interface-cache pair may be coupled to one or more single mass storage devices. By way of example, an interface-cache pair 252 is coupled to a single mass storage device 254, an interface-cache pair 256 is coupled to three single mass storage devices 258, 260, and 262, and an interface-cache pair 264 is coupled to two single mass storage devices 266 and 268.

The tracks assigned to the cache of interface-cache pair 252 correspond to those of single mass storage device 254. The cache of interface-cache pair 256 comprises a local track location table 270, and the cache of interface-cache pair 264 comprises a local track location table 272. Tables 270 and 272 are generally similar to track location tables 21 described above. Table 270 gives exact locations for tracks of single mass storage devices 258, 260, and 262; table 272 gives exact locations for tracks of single mass storage devices 266 and 268.

Configurations such as system 250 provide the advantages described above, with reference to systems 190 and 210, for the interface-cache combination. In addition, providing each cache with the ability to be connected to more than one mass storage device increases the flexibility of the system, such as by enabling local redundancy for the devices coupled to the specific cache.

Figure 13:
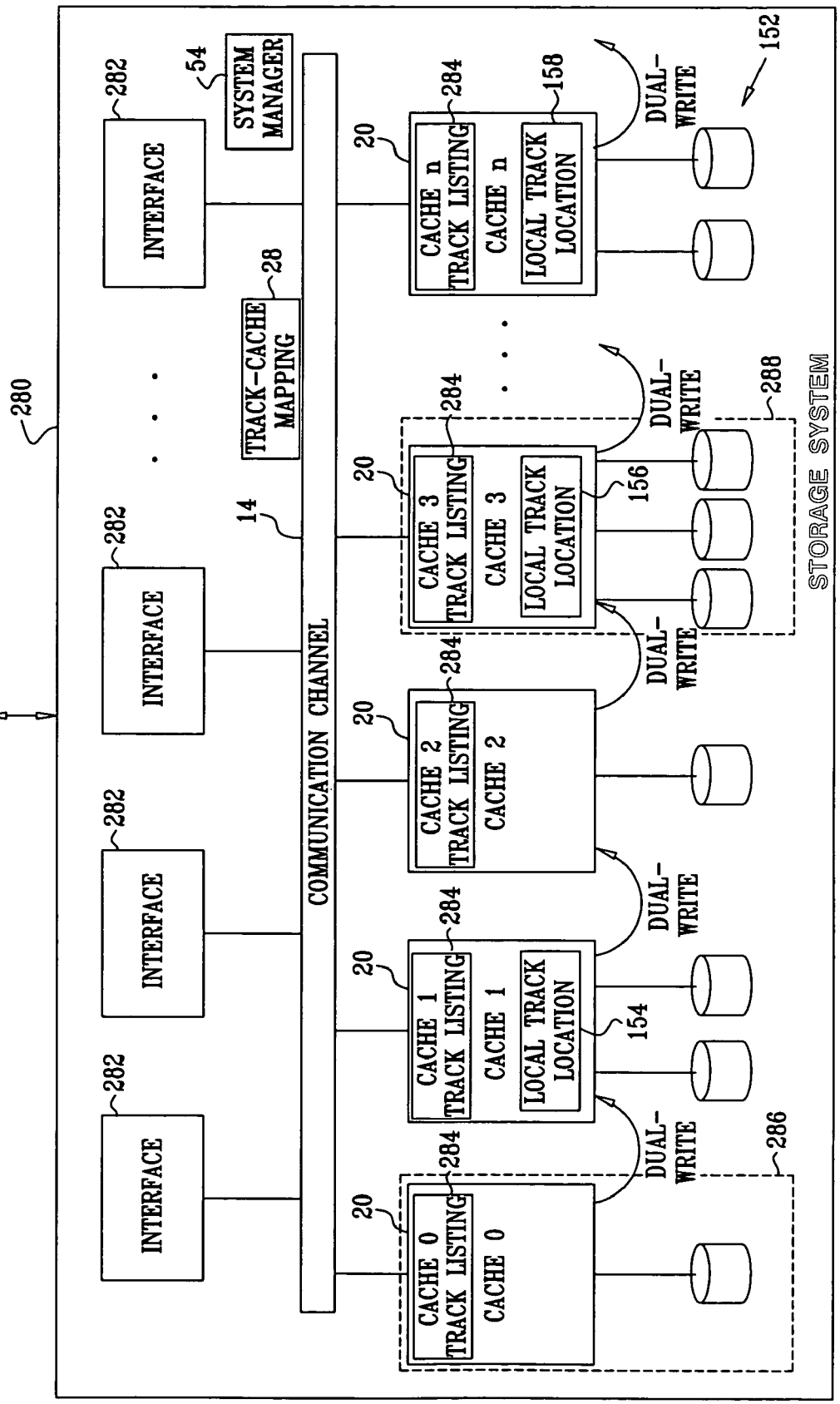
FIG. 13 is a schematic block diagram of another configuration of the system of FIG. 1, according to an embodiment of the present invention.

FIG. 13 is a schematic block diagram of a storage system 280, according to an embodiment of the present invention. Except as described hereinbelow, system 280 is generally configured and operates as system 150 (FIG. 7). System 280 comprises interfaces 282, which differ from interfaces 26 in not having a track-cache mapping 28. Rather, interfaces 282 are configured to receive IO requests from hosts 52, and to convey the requests to all caches 20 coupled to communication channel 14.

Each cache 20 comprises a respective track listing 284, specific to the cache. The cache is implemented to respond to track requests for tracks in its listing, and to ignore track requests not in its listing. It will be understood that track listings 284 derive from track-cache mapping 28, which in system 280 acts as a virtual mapping. For example, if track-cache mapping 28 corresponds to mapping (4) or Table I above, then Table VII below shows the track listings 284 of cache 0 (Ca0) and cache 1 (Ca1).

TABLE VII

| Cache 0 Track Listing | | Cache 1 Track Listing | |
| --- | --- | --- | --- |
| L (LU identifier) | n (Track number) | L (LU identifier) | n (Track number) |
| 0 | 0 | 0 | 1 |
| 0 | 16 | 0 | 17 |
| ... | ... | ... | ... |
| 1 | 0 | 1 | 1 |
| 1 | 16 | 1 | 17 |
| ... | ... | ... | ... |

Caches 20 in system 280 operate in a dual-write configuration, herein by way of example assumed to be a cyclic dual-write system wherein Cache 0 writes to Cache 1, Cache 1 writes to Cache 2, . . . , Cache n writes to cache 0. Thus, in the event of a failure of Cache 1 during processing of an IO request to a track of the cache, Cache 2 completes processing the IO request. It will be appreciated that system 280 may incorporate other types of dual-write system known in the art, such as having caches paired with each other, or having each cache "dual-writing" to more than one other cache. It will also be understood that in operating in a dual-write configuration, each specific cache 20 operates substantially independently of all other caches 20, other than the caches to which it is coupled in its dual-write configuration.

At least some of caches 20 and their associated one or more storage devices 152 are housed in single housings, typically as off-the-shelf personal computers. By way of example, cache 0 and its associated storage device 152 are implemented from a personal computer 286, and cache 3 and its associated storage devices are implemented from a personal computer 288.

Not requiring track-cache mapping 28 in interfaces 282 reduces the memory needed for the interfaces. In addition, using track listings 284 rather than the track-cache mapping 28 reduces the memory required by each specific cache.

Figure 14:
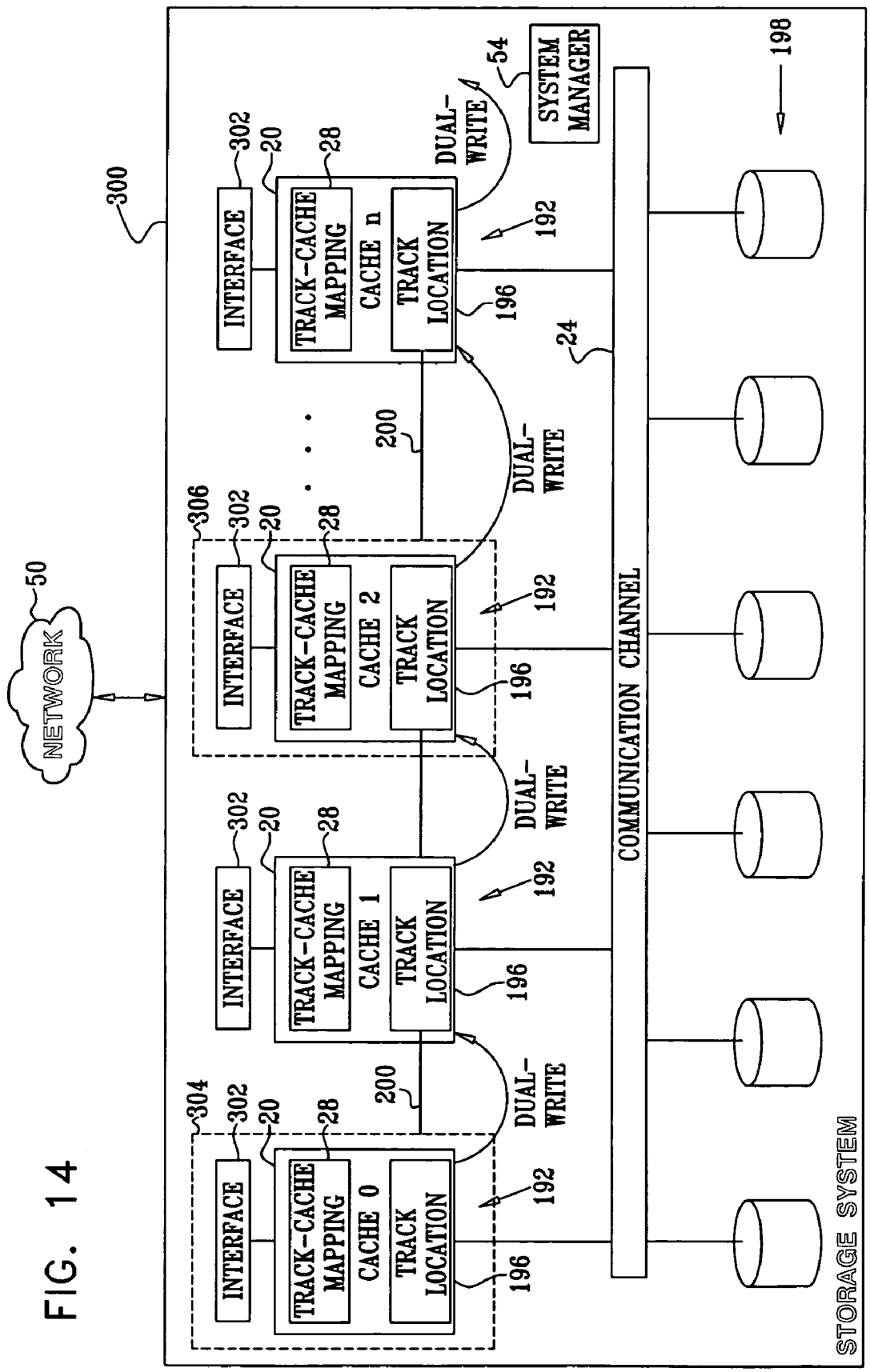
FIG. 14 is a schematic block diagram of another alternative configuration of the system of FIG. 1, according to an embodiment of the present invention.

FIG. 14 is a schematic block diagram of a storage system 300, according to an embodiment of the present invention. Except as described hereinbelow, system 300 is generally configured and operates as system 190 (FIG. 9). System 300 comprises interfaces 302, which differ from interfaces 26 in not having track-cache mapping 28. Rather, interfaces 302 are configured to receive IO requests from hosts 52, and to convey the requests to the cache 20 to which they are coupled. Each cache 20, in addition to its track location table 196, comprises a respective track-cache mapping 28.

As for system 190, each IO request received by an interface is conveyed to the cache coupled to the interface. According to the track to which the request is directed, the cache then transfers the IO request to another cache on channel 200 using its track-cache mapping 28, or, if required, uses its track location table 196 to convey the IO request to the appropriate storage device 198.

Caches 20 in system 300 preferably operate in a dual-write configuration, such as the cyclically configured dual-write system described above with reference to FIG. 13. Also, at least some of interfaces 302 and their associated caches 152 are housed in single housings, typically as off-the-shelf personal computers. By way of example, a first interface 302 and its associated cache 20 are implemented from a personal computer 304, and a second interface 302 and its associated cache 20 are implemented from a personal computer 306.

It will be appreciated that system 300 has generally similar advantages to those described above for system 190, with the added advantage of including a dual-write system.

It will be understood that features described above for specific storage systems, such as track listings 284 in system 280, incorporation of track-cache mappings 28 into caches 20 in system 300, and use of one or more personal computers to implement interfaces, caches, and/or mass storage devices, typically in a single housing, may be advantageously implemented in other storage systems not specifically described above. It will also be understood that a storage system may be implemented from combinations of systems, and parts of those systems, described above, such as configuring a storage system to partly comprise elements of system 150 and elements of system 250.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A storage system, comprising:
    one or more mass storage devices, coupled to store data at respective first ranges of logical addresses (LAs);
    one or more interfaces, which are adapted to receive input/output (IO) requests from host processors directed to specified LAs; and
    a plurality of caches coupled to the one or more interfaces so as to receive the IO requests therefrom, each cache being assigned a respective second range of the LAs and being coupled to the one or more mass storage devices, the respective first ranges of which overlap the respective second ranges, so as to receive data from and provide data to the one or more mass storage devices, and being coupled to accept the IO requests within the respective second range directed thereto.

2. The storage system according to claim 1, wherein the one or more mass storage devices comprise a plurality of mass storage devices, and wherein each cache is directly connected to one or more of the plurality of mass storage devices.

3. The storage system according to claim 1, wherein the one or more interfaces are adapted to direct the IO requests to all of the plurality of caches.

4. The storage system according to claim 1, wherein the one or more interfaces comprise a mapping between the second ranges of each of the caches and the LAs and are adapted to convert the IO requests to one or mow requests and to direct the one or more requests to respective one or more caches in response to the mapping.

5. The storage system according to claim 1, wherein each cache comprises a listing of LAs corresponding to the second range of the each cache, and wherein the each cache is adapted to ignore IO requests directed to LAs not comprised in the listing.

6. The storage system according to claim 1, wherein the plurality of caches comprises a first cache and a second cache, and wherein the first cache is coupled to write an IO request directed to the first cache to the second cache.

7. The storage system according to claim 6, wherein the plurality of caches further comprises one or more third caches which are adapted to operate substantially independently of the first and second caches.

8. The storage system according to claim 1, wherein each of the plurality of caches is adapted to operate substantially independently of remaining caches comprised in the plurality.

9. The storage system according to claim 1, wherein each of the plurality of caches are at an equal hierarchical level.

10. The storage system according to claim 1, wherein all of the LAs of the second ranges comprise all of the LAs of the one or more mass storage devices.

11. The storage system according to claim 1, wherein one or more of the one or more mass storage devices, the one or more interfaces, and the plurality of caches, are implemented from an industrially available personal computer.

12. The storage system according to claim 1, wherein one or more of the one or more mass storage devices, the one or more interfaces, and the plurality of caches, are housed in a single housing.

13. A storage system, comprising:
    one or more mass storage devices, coupled to store data at respective first ranges of logical addresses (LAs);
    a plurality of caches, each cache being assigned a respective second range of the LAs and being directly connected to one or more of the mass storage devices, the respective first ranges of which overlap the respective second ranges, so as to receive data from and provide data to the one or more mass storage devices;

one or more interfaces, which are adapted to receive input/output (IO) requests from host processors directed to specified LAs and to direct all the IO requests to the cache to which the specified LAs are assigned; and a communication channel to which the one or more interfaces and a second plurality of caches of the plurality of caches are connected, and which is adapted to convey the data and the IO requests therebetween.

14. The storage system according to claim 13, wherein the one or more interfaces comprise a mapping between the second ranges of each of the caches and the LAs and are adapted to convert the IO requests to one or more requests and to direct the one or more requests to respective one or more caches in response to the mapping.

15. The storage system according to claim 13, wherein one of the caches is coupled to two or more mass storage devices and comprises a location table providing locations of the second range of the LAs assigned to the one cache in the two or more mass storage devices.

16. The storage system according to claim 13, wherein the plurality of caches comprises two or more caches, and wherein the two or more caches are directly connected to one of the mass storage devices, the first range of which overlaps each of the respective second ranges of the two or more caches, so as to receive data from and provide data to the one mass storage device.

17. A storage system, comprising:
one or more mass storage devices, coupled to store data at respective first ranges of logical addresses (LAs);

a plurality of caches, each cache being assigned a respective second range of the LAs and being coupled to the one or more mass storage devices, the respective first ranges of which overlap the respective second ranges, so as to receive data from and provide data to the one or more mass storage devices; and a plurality of interfaces, each interface being directly connected to a respective cache and being adapted to receive input/output (IO) requests from host processors directed to specified LAs and to direct all the IO requests to the cache to which the specified LAs are assigned.

18. The storage system according to claim 17, and comprising a communication channel to which the one or more mass storage devices and the plurality of caches are connected, and which is adapted to convey data and the IO requests therebetween.

19. The storage system according to claim 17, wherein each interface comprises a mapping between the second ranges of each of the caches and the LAs and is adapted to convert the IO requests to one or more requests and to direct the one or more requests to respective one or more of the caches in response to the mapping.

20. The storage system according to claim 17, wherein one of the plurality of caches and one of the interfaces are housed in a single housing.

21. The storage system according to claim 17, wherein the one or more mass storage devices comprises a plurality of mass storage devices, and wherein each of the plurality of mass storage devices is directly connected to a respective cache.

22. The storage system according to claim 21, and comprising a plurality of single housings which respectively house a respective interface, a respective cache, and a respective mass storage device.

23. The storage system according to claim 17, wherein the one or more mass storage devices comprises a multiplicity of mass storage devices, and wherein two or more caches of the plurality of caches are directly coupled to one of the mass storage devices.

24. The storage system according to claim 23, wherein one of the caches of the two or more caches and one of the interfaces are housed in a single housing.

25. The storage system according to claim 17, wherein the one or more storage devices comprise a multiplicity of mass storage devices, and wherein each of the caches is directly connected to one or more of the multiplicity of mass storage devices.

26. The storage system according to claim 25, wherein one of the caches is coupled to two or more mass storage devices and comprises a location table providing locations in the two or more mass storage devices of the second range of the LAs assigned to the one cache.

27. A storage system, comprising: one or more mass storage devices, coupled to store data at respective first ranges of logical addresses (LAs); a plurality of caches, each cache being assigned a respective second range of the LAs so that the LAs of all the respective second ranges comprise the LAs of all the respective first ranges; a first communication channel to which the one or more mass storage devices and the plurality of caches are connected, and which is adapted to convey data and input/output (IO) requests therebetween; one or more interfaces, which are adapted to receive the IO requests from host processors directed to specified LAs and to direct all the IO requests to the cache to which the specified LAs are assigned; and a second communication channel to which the one or more interfaces and the plurality of caches are connected, and which is adapted to convey the data and the IO requests therebetween.

28. The storage system according to claim 27, wherein the one or more interfaces comprise a mapping between the second ranges of the caches and the LAs, and wherein the one or more interfaces are adapted to convert the IO requests to one or more requests and to direct the one or more requests to respective one or more of the caches in response to the mapping.

29. The storage system according to claim 27, wherein the plurality of caches comprise respective location tables, wherein each location table comprises locations of the second range of the LAs assigned to the respective cache in the one or more mass storage devices.

30. A storage system, comprising: a plurality of mass storage devices, coupled to store data at respective first ranges of logical addresses (LAs); a plurality of caches, configured to operate independently of one another, each cache being directly connected to a respective mass storage device so as to receive data from and provide data to the respective mass storage device, and being assigned the respective range of LAs of the respective mass storage device; one or more interfaces, which are adapted to receive input/output (IO) requests from host processors directed to specified LAs and to direct all the IO requests to the cache to which the specified LAs are assigned; and a communication channel to which the one or more interfaces and the plurality of caches are connected, and which is adapted to convey data and the IO requests therebetween.

31. The storage system according to claim 30, wherein the one or more interfaces comprise a mapping between the plurality of caches and the LAs, and wherein the one or more interfaces are adapted to convert the IO requests to one or more requests and to direct the one or more requests to respective one or more of the caches in response to the mapping.

32. A network attached storage (NAS) system, comprising:
    one or more mass storage devices, coupled to store file-based data at respective first ranges of logical addresses (LAs);
    a plurality of caches, each cache being assigned a respective second range of the LAs so that the LAs of all the respective second ranges comprise the LAs of all the respective first ranges, the caches being coupled to receive file-based data from and provide file-based data to the one or more mass storage devices having LAs within the respective second ranges; and
    one or more interfaces, which are adapted to receive file-based input/output (IO) requests from host processors directed to specified LAs and to direct all the file-based IO requests to the caches to which the specified LAs are assigned.

33. The NAS system according to claim 32, wherein the one or more interfaces comprise a file-based mapping between the plurality of caches and the LAs, and wherein the one or more interfaces are adapted to convert the file-based IO requests to one or more file-based requests and to direct the one or more file-based requests to respective one or more of the plurality of caches in response to the file-based mapping.

34. A storage area network (SAN) system, comprising:
    one or more mass storage devices, coupled to store block-based data at respective first ranges of logical addresses (LAs);
    a plurality of caches, each cache being assigned a respective second range of the LAs so that the LAs of all the respective second ranges comprise the LAs of all the respective first ranges, the caches being coupled to receive block-based data from and provide block-based data to the one or more mass storage devices having LAs within the respective second range; and
    one or more interfaces, which are adapted to receive block-based input/output (IO) requests from host processors directed to specified LAs and to direct all the block-based IO requests to the caches to which the specified LAs are assigned.

35. The SAN system according to claim 34, wherein the one or more interfaces comprise a block-based mapping between the plurality of caches and the LAs, and wherein the one or more interfaces are adapted to convert the block-based IO requests to one or more block-based requests anti to direct the one or more block-based requests to respective one or more of the plurality of caches in response to the block-based mapping.

36. A method for storing data, comprising:
    coupling one or more mass storage devices to store data at respective first ranges of logical addresses (LAs);
    receiving in one or more interfaces input/output (IO) requests from host processors directed to specified LAs; and
    coupling a plurality of caches to the one or more interfaces so as to receive the IO requests therefrom, each cache being assigned a respective second range of the LAs and being coupled to the one or more mass storage devices, the respective first ranges of which overlap the respective second ranges, so as to receive data from and provide data to the one or more mass storage devices, and being coupled to accept the IO requests within the respective second range directed thereto.

37. A method for storing data in a network attached storage (NAS) system, comprising:
    coupling one or more mass storage devices to store file-based data at respective first ranges of logical addresses (LAs);
    assigning each of a plurality of caches a respective second range of the LAs so that the LAs of all the respective second ranges comprise the LAs of all the respective first ranges;
    coupling the caches to receive the file-based data from and provide the file-based data to the one or more mass storage devices having LAs within the respective second range;
    receiving file-based input/output (IO) requests from host processors directed to specified LAs; and
    directing the file-based IO requests to the caches to which the specified LAs are assigned.

38. A method for storing data in a storage area network (SAN), comprising:
    coupling one or more mass storage devices to store block-based data at respective first ranges of logical addresses (LAs);
    assigning each of a plurality of caches a respective second range of the LAs so that the LAs of all the respective second ranges comprise the LAs of all the respective first ranges;
    coupling the caches to receive the block-based data from and provide the block-based data to the one or more mass storage devices having LAs within the respective second range;
    receiving block-based input/output (IO) requests from host processors directed to specified LAs; and
    directing the block-based IO requests to the caches to which the specified LAs are assigned.

* * * * *